(12) United States Patent
Lin et al.

(10) Patent No.: US 11,166,303 B2
(45) Date of Patent: Nov. 2, 2021

(54) DATA TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Yanan Lin, Guangdong (CN); Hua Xu, Ottawa (CA)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 25 days.

(21) Appl. No.: 16/491,991

(22) PCT Filed: Mar. 20, 2017

(86) PCT No.: PCT/CN2017/077218
§ 371 (c)(1),
(2) Date: Sep. 6, 2019

(87) PCT Pub. No.: WO2018/170656
PCT Pub. Date: Sep. 27, 2018

(65) Prior Publication Data
US 2020/0077433 A1   Mar. 5, 2020

(51) Int. Cl.
*H04W 72/14* (2009.01)
*H04W 72/12* (2009.01)
(Continued)

(52) U.S. Cl.
CPC ....... *H04W 72/1289* (2013.01); *H04L 5/0007* (2013.01); *H04L 5/0053* (2013.01);
(Continued)

(58) Field of Classification Search
None
See application file for complete search history.

(56) References Cited

U.S. PATENT DOCUMENTS

2015/0181440 A1* 6/2015 Chen .................. H04L 5/02
370/329
2015/0327225 A1  11/2015 Xia et al.
(Continued)

FOREIGN PATENT DOCUMENTS

CN    103580792    2/2014
CN    105682232    6/2016
(Continued)

OTHER PUBLICATIONS

Federal Service for Intellectual Property (Rospatent), Office Action for RU Application No. 2019132419/07, dated Jun. 22, 2020.
(Continued)

*Primary Examiner* — Brandon M Renner
(74) *Attorney, Agent, or Firm* — Hodgson Russ LLP

(57) ABSTRACT

The present application discloses a method for transmitting data, a terminal device, and a network device. The method includes: receiving, by a terminal device, first resource indication information from a network device at a first moment, the first moment being located in the n-th time domain resource unit, the first resource indication information indicating a frequency domain resource allocated for transmission of a target channel in the (n+i)-th time domain resource unit, and the target channel including a data channel or a control channel of the terminal device, where n and i are positive integers; and receiving, by the terminal device, second resource indication information from the network device at a second moment after the first moment, the second resource indication information indicating a time domain resource allocated for transmission of the target channel in the (n+i)-th time domain resource unit.

26 Claims, 9 Drawing Sheets

(51) Int. Cl.
*H04L 5/00* (2006.01)
*H04W 72/04* (2009.01)

(52) U.S. Cl.
CPC ......... *H04L 5/0094* (2013.01); *H04W 72/042* (2013.01); *H04W 72/0446* (2013.01); *H04W 72/1263* (2013.01)

(56) References Cited

U.S. PATENT DOCUMENTS

| | | | | |
|---|---|---|---|---|
| 2016/0028505 | A1* | 1/2016 | Pi | H04L 1/0068 714/807 |
| 2017/0019882 | A1 | 1/2017 | Nimbalker et al. | |
| 2017/0034850 | A1 | 2/2017 | Alvarino et al. | |
| 2017/0230994 | A1* | 8/2017 | You | H04L 5/0053 |
| 2018/0270796 | A1* | 9/2018 | Chae | H04W 72/12 |
| 2018/0376487 | A1* | 12/2018 | Feng | H04W 56/001 |
| 2019/0029050 | A1* | 1/2019 | Li | H04L 5/0094 |
| 2019/0069320 | A1* | 2/2019 | Gao | H04W 72/14 |
| 2019/0200367 | A1* | 6/2019 | Zhu | H04W 24/10 |
| 2020/0068544 | A1* | 2/2020 | Xue | H04W 72/042 |
| 2020/0162212 | A1* | 5/2020 | Liu | H04W 72/0453 |

FOREIGN PATENT DOCUMENTS

| | | |
|---|---|---|
| CN | 106162907 A | 11/2016 |
| EP | 3402266 | 11/2018 |
| JP | 2017539128 | 12/2017 |
| KR | 20100127837 | 12/2010 |
| KR | 20140111317 | 9/2014 |
| RU | 2553076 | 6/2015 |
| RU | 2578673 | 3/2016 |
| WO | 2016069270 A1 | 5/2016 |

OTHER PUBLICATIONS

3GPP TSG RAN WG1 Meeting #88bis, Spokane, USA, Apr. 3-7, 2017, R1-1704172, Apr. 7, 2017.
WIPO, ISR for PCT/CN2017/077218, Jul. 28, 2017.
EPO, Office Action for EP Application No. 17901910.4, dated Feb. 11, 2020.
EPO, Office Action for EP 17901910.4, dated Oct. 8, 2020.
Intellectual Property India, First Examination Report for IN 201917036132, dated Dec. 7, 2020.
Canadian Intellectual Property Office, First Office Action for CA 3056687, dated Oct. 23, 2020.
INAPI Chile, First Office Action for CL 201902643, dated Nov. 25, 2020.
SIPO, First Office Action for CN 201911328698.9, dated Nov. 3, 2020.
NEC, "DCI moniotring configuration for mini-slot", 3GPP TSG RAN WG1 Meeting #88, R1-1701980, 2 pages, Feb. 6, 2017, Greece.
Huawei, "Email discussion [86b-23] on multi-steps DL control channel design", 3GPP TSG RAN WG1 Meeting #87, R1-1611656, 13 pages, Nov. 14, 2016, USA.
JPO, Office Action for JP Application No. 2019-550229, dated Mar. 5, 2021.
Interdigital Communications, "Downlink scheduling using slots and mini-slots," 3GPP TSG-RAN WG1 Meeting #87, R1-1612314, Nov. 2016, 4 pages.
NTT DOCOMO, "Initial views on DL control channel design," 3GPP TSG RAN WG1 Meeting #86bis, R1-1610058, Oct. 2016, 7 pages.
KIPO, Office Action for KR Application No. 10-2019-7027035, dated Feb. 26, 2021.
KIPO, Office Action for KR Application No. 10-2019-7027035, dated Aug. 30, 2021.

* cited by examiner

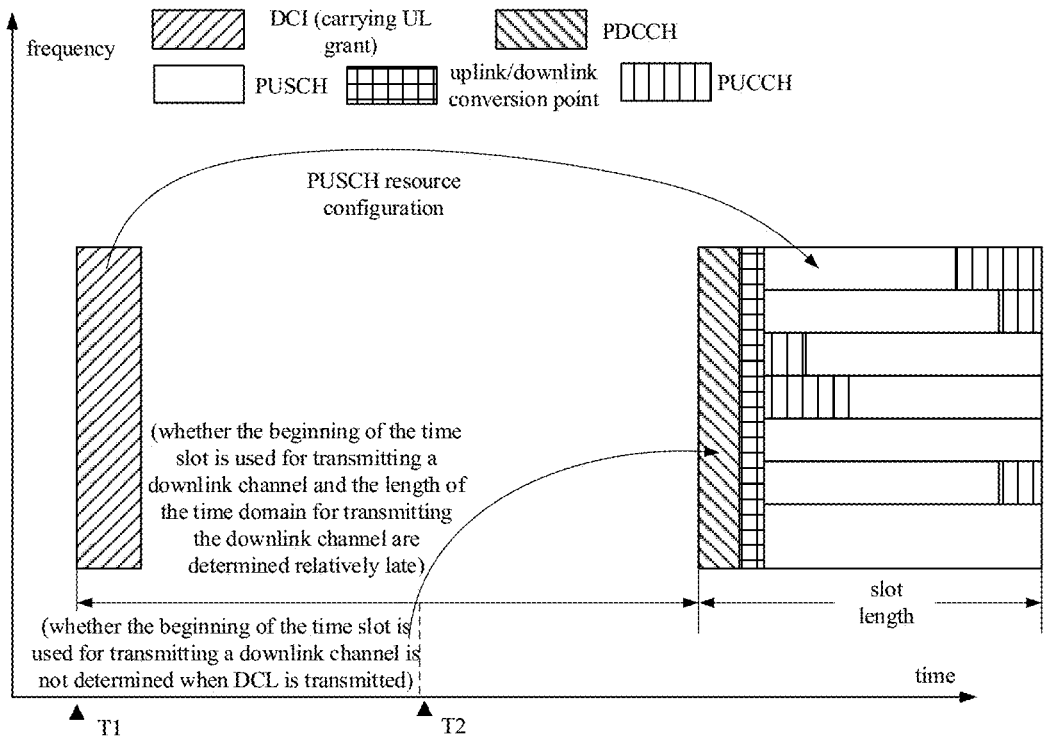

FIG. 5

600 the terminal device receives first resource indication information from the network device at a first moment. The first time instant is located in the n-th time domain resource unit, the first resource indication information indicates a frequency domain resource allocated for transmission of the target channel of the terminal device in the (n+i)-th time domain resource unit ~ 610 the terminal device receives second resource indication information from the network device at a second moment after the first moment. The second resource indication information indicates a time domain resource allocated for transmission of the data channel in the (n+i)-th time domain resource unit ~ 620 the terminal device sends the target channel to the network device or receives the target channel from the network device on the frequency domain resource in the (n+i)-th time domain resource unit and the time domain resource ~ 630

┌─────────────────────────────────────────────────┐
│ the network device sends first resource indication information │
│ to the network device at a first moment. The first moment is │
│ located in the n-th time domain resource unit, the first resource │  ~ 1110
│ indication information indicates a frequency domain resource │
│ allocated for transmission of the target channel of the terminal │
│ device in the (n+i)-th time domain resource unit │
└─────────────────────────────────────────────────┘

┌─────────────────────────────────────────────────┐
│ the network device sends second resource indication │
│ information to the terminal device at a second moment after the │
│ first moment. The second resource indication information │  ~ 1120
│ indicates a time domain resource allocated for transmission of │
│ the target channel in the (n+i)-th time domain resource unit │
└─────────────────────────────────────────────────┘

┌ ─ ─ ─ ─ ─ ─ ─ ─ ─ ─ ─ ─ ─ ─ ─ ─ ─ ─ ─ ─ ─ ─ ┐
│ the network device sends the target channel to the terminal │
│ device or sends the target channel to the terminal device on the │  ~ 1130
│ frequency domain resource in the (n+i)-th time domain resource │
│ unit and the time domain resource │
└ ─ ─ ─ ─ ─ ─ ─ ─ ─ ─ ─ ─ ─ ─ ─ ─ ─ ─ ─ ─ ─ ─ ┘

FIG. 11

DATA TRANSMISSION METHOD, TERMINAL DEVICE AND NETWORK DEVICE

CROSS-REFERENCE TO RELATED APPLICATION

This application is a U.S. national phase application of International Application No. PCT/CN2017/077218, filed Mar. 20, 2017, the entire disclosure of which is incorporated herein by reference.

TECHNICAL FIELD

The present disclosure relates to the field of wireless communication, and more particularly, to a method for transmitting data, a terminal device and a network device.

BACKGROUND

In a 5G New Radio (briefly as "NR") system, some symbols in a time domain scheduling unit such as a time slot or a mini-slot can be used for transmitting a control channel and other symbols are used for transmitting a data channel. It supports that some symbols in one time domain scheduling unit are used for transmitting downlink channels and other symbols are used for transmitting uplink channels. In one time domain scheduling unit, the base station indicates to the terminal by Downlink Control Information (briefly as "DCI") which symbols are used for transmitting the control channel and which symbols are used for transmitting the data channel.

In addition, inter-slot scheduling is supported in a 5G system. That is, the transmission of the data channel in the (n+i)-th time slot (n and i are positive integers) is scheduled by the DCI transmitted in the n-th time slot.

SUMMARY

The embodiments of the present application provide a method for transmitting data, a terminal device, and a network device.

In a first aspect, a method of transmitting data is provided, including: receiving, by a terminal device, first resource indication information from a network device at a first moment, the first moment being located in the n-th time domain resource unit, the first resource indication information indicating a frequency domain resource allocated for transmission of a target channel in the (n+i)-th time domain resource unit, and the target channel including a data channel or a control channel of the terminal device, where n and i are positive integers; and receiving, by the terminal device, second resource indication information from the network device at a second moment after the first moment, the second resource indication information indicating a time domain resource allocated for transmission of the target channel in the (n+i)-th time domain resource unit.

Optionally, in an implementation of the first aspect, the time domain resource allocated for transmission of the target channel in the (n+i)-th time domain resource unit is determined by the network device after the first moment.

Optionally, in an implementation of the first aspect, the method further includes: sending, by the terminal device, the target channel to the network device, or receiving, by the terminal device, the target channel from the network device, on the frequency domain resource and the time domain resource in the (n+i)-th time domain resource unit.

Optionally, in an implementation of the first aspect, the time domain resource indicated by the second resource indication information includes at least one of: a start location of symbols allocated for transmission of the target channel in the (n+i)-th time domain resource unit, a number of symbols allocated for transmission of the target channel, a mini-slot allocated for transmission of the target channel, and a number of mini-slots allocated for transmission of the target channel.

Optionally, in an implementation of the first aspect, the second resource indication information includes an identifier of the time domain resource, and the time domain resource indicated by the second resource indication information is a time domain resource corresponding to the identifier in a plurality of preset time domain resources.

Optionally, in an implementation of the first aspect, the first resource indication information further indicates a time domain resource allocated for transmission of the target channel in the (n+i)-th time domain resource unit.

Optionally, in an implementation of the first aspect, the method further includes: determining, by the terminal device, whether the time domain resource indicated by the first resource indication information is the same as the time domain resource indicated by the second resource indication information; and when the time domain resource indicated by the first resource indication information is different from the time domain resource indicated by the second resource indication information, determining, by the terminal device, to use the time domain resource indicated by the second resource indication information to transmit the target channel.

Optionally, in an implementation of the first aspect, the method further includes: determining, by the terminal device, the time domain resource allocated for transmission of the target channel according to the second resource indication information, within a range of time domain resources indicated by the first resource indication information.

Optionally, in an implementation of the first aspect, receiving, by the terminal device, second resource indication information from the network device at a second moment after the first moment includes: receiving, by the terminal device, second resource indication information from the network device at a second moment after the first moment on a preset frequency domain resource.

Optionally, in an implementation of the first aspect, the first resource indication information includes the second moment and the preset frequency domain resource for receiving the second resource indication information, and before the terminal device receives the second resource indication information from the network device, the method further includes: determining, by the terminal device, the second moment and the preset frequency domain resource for receiving the second resource indication information according to the first resource indication information.

Optionally, in an implementation of the first aspect, the second resource indication information is UE specific information of the terminal device.

Optionally, in an implementation of the first aspect, the n-th time domain resource unit includes any one of: an n-th time slot, an n-th mini-slot, and an n-th subframe.

Optionally, in an implementation of the first aspect, the physical channel used by the terminal device to receive the first resource indication information is different from the physical channel used to receive the second resource indication information.

Optionally, in an implementation of the first aspect, the data channel includes any one of: an uplink data channel, a downlink data channel, and a secondary link data channel.

In a second aspect, a method of transmitting data is provided, including: sending, by a network device, first resource indication information to a terminal device at a first moment, the first moment being located in the n-th time domain resource unit, the first resource indication information indicating a frequency domain resource allocated for transmission of a target channel in the (n+i)-th time domain resource unit, and the target channel including a data channel or a control channel of the terminal device, where n and i are positive integers; and sending, by a network device, second resource indication information to the terminal device at a second moment after the first moment, the second resource indication information indicating a time domain resource allocated for transmission of the target channel in the (n+i)-th time domain resource unit.

Optionally, in an implementation of the second aspect, the time domain resource allocated for transmission of the target channel in the (n+i)-th time domain resource unit is determined by the network device after the first moment.

Optionally, in an implementation of the second aspect, the method further includes: receiving, by the network device, the target channel from the terminal device, or sending, by the network device, the target channel to the terminal device, on the frequency domain resource and the time domain resource in the (n+i)-th time domain resource unit.

Optionally, in an implementation of the second aspect, the time domain resource indicated by the second resource indication information includes any one of: a start location of symbols allocated for transmission of the target channel in the (n+i)-th time domain resource unit, a number of symbols allocated for transmission of the target channel, a mini-slot allocated for transmission of the target channel, and a number of mini-slots allocated for transmission of the target channel.

Optionally, in an implementation of the second aspect, the second resource indication information includes an identifier of the time domain resource, and the time domain resource indicated by the second resource indication information is a time domain resource corresponding to the identifier in a plurality of preset time domain resources.

Optionally, in an implementation of the second aspect, the first resource indication information further indicates a time domain resource allocated for transmission of the target channel in the (n+i)-th time domain resource unit.

Optionally, in an implementation of the second aspect, the method further includes: determining, by the network device, whether the time domain resource indicated by the first resource indication information is the same as the time domain resource indicated by the second resource indication information; and when the time domain resource indicated by the first resource indication information is different from the time domain resource indicated by the second resource indication information, determining, by the network device, use the time domain resource indicated by the second resource indication information to transmit the target channel Optionally, in an implementation of the second aspect, the method further includes: determining, by the network device, the time domain resource allocated for transmission of the target channel according to the second resource indication information, within a range of time domain resources indicated by the first resource indication information.

Optionally, in an implementation of the second aspect, sending, by a network device, second resource indication information to the terminal device at a second moment after the first moment includes: sending, by the network device, second resource indication information to the terminal device at the second moment after the first moment on a preset frequency domain resource.

Optionally, in an implementation of the second aspect, the first resource indication information includes the second moment and the preset frequency domain resource for receiving the second resource indication information, and before the network sends the second resource indication information to the terminal device, the method further includes: determining, by the network device, the second moment and the preset frequency domain resource for receiving the second resource indication information.

Optionally, in an implementation of the second aspect, the method further includes: the second resource indication information is UE specific information of the terminal device.

Optionally, in an implementation of the second aspect, the method further includes: the n-th time domain resource unit includes any one of: an n-th time slot, an n-th mini-slot, and an n-th subframe.

Optionally, in an implementation of the second aspect, the method further includes: the physical channel used by the network device to send the first resource indication information is different from the physical channel used to send the second resource indication information.

Optionally, in an implementation of the second aspect, the data channel includes any one of: an uplink data channel, a downlink data channel, and a secondary link data channel In a third aspect, a terminal device is provided, which can perform the operations of the terminal device in the first aspect or any of the optional implementations of the first aspect. In particular, the terminal device may include modules and units for performing the operations of the terminal device in the first aspect or any of the possible implementations of the first aspect described above.

In a fourth aspect, a network device is provided, which can perform the operations of the network device in the second aspect or any of the optional implementations of the second aspect. In particular, the network device may include modules and units for performing the operations of the network device in the second aspect or any of the possible implementations of the second aspect described above.

In a fifth aspect, a terminal device is provided. The terminal device includes: a processor, a transceiver, and a memory. The processor, the transceiver, and the memory communicate with each other through an internal connection path. The memory is for storing instructions and the processor is for executing instructions stored by the memory. When the processor executes the instructions stored by the memory, the terminal device is caused to perform the method in the first aspect or any of the possible implementations of the first aspect, or the terminal device is caused to implement the terminal provided in the third aspect device.

In a sixth aspect, a network device is provided. The network device includes: a processor, a transceiver, and a memory. The processor, the transceiver, and the memory communicate with each other through an internal connection path. The memory is for storing instructions and the processor is for executing instructions stored by the memory. When the processor executes the instruction stored by the memory, the network device is caused to perform the method in the second aspect or any of the possible implementations of the second aspect, or the network device is caused to implement the network provided in the fourth aspect device.

In a seventh aspect, a computer readable storage medium is provided, the computer readable storage medium storing a program causing a terminal device to perform the method for transmitting data in the first aspect described above, and any one of its various implementations.

In an eighth aspect, a computer readable storage medium is provided, the computer readable storage medium storing a program causing a network device to perform the method for transmitting data in the second aspect described above, and any one of its various implementations.

In a ninth aspect, a system chip is provided, the system chip including an input interface, an output interface, a processor, and a memory. The processor is configured to execute an instruction stored by the memory, and when the instruction is executed, the processor can implement the first aspect and any of its various implementations.

In a tenth aspect, a system chip is provided, the system chip including an input interface, an output interface, a processor, and a memory. The processor is configured to execute an instruction stored by the memory, and when the instruction is executed, the processor can implement the second aspect and any of the various implementations.

BRIEF DESCRIPTION OF THE DRAWINGS

FIG. 5 is a schematic diagram of resource configuration of a PUSCH in the related art.

FIG. 6 is a schematic flowchart of a method for transmitting data according to an embodiment of the present application.

FIG. 11 is a schematic flowchart of a method for transmitting data according to an embodiment of the present application.

DETAILED DESCRIPTION

The technical solutions in the embodiments of the present application will be described below with reference to the accompanying drawings.

It should be understood that the technical solutions of the embodiments of the present application can be applied to various communication systems, for example, a Global System of Mobile Communication (briefly as "GSM") system, a Code Division Multiple Access (briefly as "CDMA") system, a Wideband Code Division Multiple Access (briefly as "WCDMA") system, a Long Term Evolution (briefly as "LTE") system, a LTE Frequency Division Duplex (briefly as "FDD") System, a LTE Time Division Duplex (briefly as "TDD"), a Universal Mobile Telecommunication System (briefly as "UMTS"), a future 5G communication system and so on.

The present application describes various embodiments in connection with a terminal device. A terminal device may also be referred to as a User Equipment ("UE"), an access terminal, a subscriber unit, a subscriber station, a mobile station, a mobile site, a remote station, a remote terminal, a mobile device, a user terminal, a terminal, and a wireless communication device, a user agent or a user device. The access terminal may be a cellular phone, a cordless phone, a Session Initiation Protocol (briefly as "SIP") phone, a Wireless Local Loop (briefly as "WLL") station, or a personal digital assistant (briefly as "PDA"), a handheld device with wireless communication capabilities, a computing device or other processing device connected to a wireless modem, an in-vehicle device, a wearable device, a terminal device in a future 5G network, or a future evolving land-based public mobile communication network (briefly as "PLMN") terminal equipment in the network.

The present application describes various embodiments in connection with a network device. The network device may be a device for communicating with the terminal device, for example, may be a base station (briefly as "BTS") in the GSM system or CDMA, or may be a base station (NodeB, briefly as "NB") in the WCDMA system, may also be an evolved base station (Evolutional Node B, briefly as "eNB" or "eNodeB") in the LTE system, or the network device may be a relay station, an access point, an in-vehicle device, a wearable device, and a network side device in a future 5G network or a network side device in a future evolved PLMN network, and so on.

Figure 1:
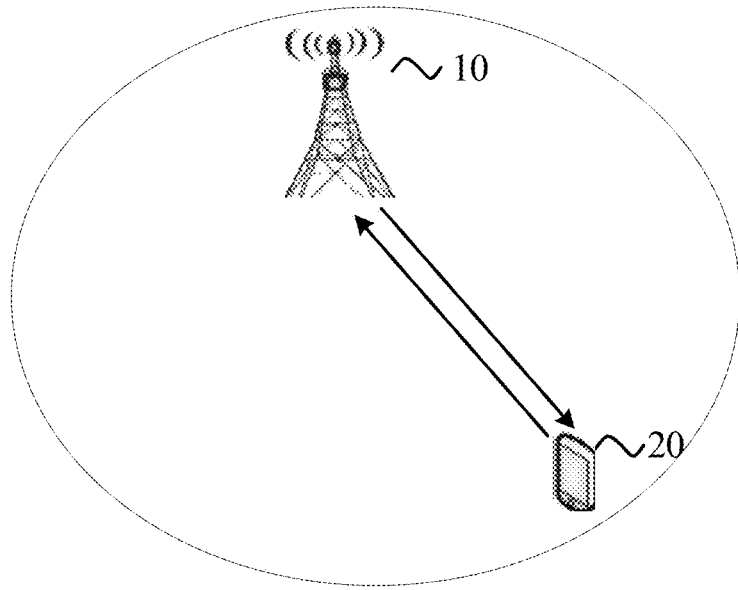
FIG. 1 is a schematic structural diagram of an application scenario of an embodiment of the present application.

FIG. 1 is a schematic diagram of an application scenario of an embodiment of the present application. The communication system in FIG. 1 may include a network device 10 and a terminal device 20. The network device 10 is configured to provide communication service for the terminal device 20 and access the core network. The terminal device 20 can access the network by searching for synchronization signals, broadcast signals, and the like from the network device 10, thereby performing communication with the network. The arrows shown in FIG. 1 may represent uplink/downlink transmissions by a cellular link between the terminal device 20 and the network device 10.

The network in the embodiment of the present application may refer to a Public Land Mobile Network (briefly as "PLMN") or a Device to Device (briefly as "D2D") network or a Machine to Machine/Man (briefly as "M2M") network or other network. FIG. 1 is only a simplified schematic diagram of the example, and the network may also include other terminal devices, which are not shown in FIG. 1.

In the current system bandwidth of the Long Term Evolution (briefly as "LTE") system, the Physical Downlink Control Channel (briefly as "PDCCH") occupies the first few symbols in one subframe for transmission. The number of symbols occupied by the PDCCH is indicated by a Physical Control Format Indicator Channel (briefly as "PCFICH") in the same subframe. Therefore, which symbols are occupied by the Physical Downlink Shared Channel (briefly as "PDSCH") is in one subframe can be derived from the information of the symbols occupied by the PDCCH indicated by the PCFICH in the same subframe, without additionally indicating to the terminal.

However, in a 5G New Radio (briefly as "NR") system, a time domain resource unit, or a time domain scheduling unit, such as a time slot, a mini-slot, a PDCCH may exist in the first few symbols, but how many symbols are for transmitting the PDCCH may be different in each resource block (briefly as "PRB"). When the base station transmits the PDSCH to the terminal in a certain PRB, the start symbol for transmitting the PDSCH in the PRB may be indicated by Downlink Control Information (briefly as "DCI"). In addition, the "two-way time slot" will be supported in the 5G system. That is, the first half of one time slot can be used for downlink transmission, and the second half can be used for uplink transmission. Therefore, the last few symbols of one time slot may not be for transmitting the PDSCH but to transmit an uplink channel such as a Physical Uplink Control Channel ((briefly as "PUCCH"), and the number of symbols occupied by the PUCCH in the time slot can also be indicated by DCI. Therefore, which symbols in a time slot in a 5G system are for transmitting PDSCH can also be learned by DCI.

For the physical uplink shared channel (briefly as "PUSCH"), in the LTE system, which symbols are occupied by the PUSCH in one subframe are statically determined according to the frame structure. Therefore, the resource location of the resource for transmitting the PUSCH allocated by the base station for the terminal in the subframe is completely determined, without the need to be indicated to the terminal. However, in a 5G system, in a time domain resource unit, after the base station schedules a certain PRB for the terminal, the PUSCH in the PRB may occupy the entire time domain resource unit, and may also occupy only a few symbols in the time domain resource unit and other symbols are occupied by other channels such as PUCCH, PDCCH, and the like. Therefore, in the 5G system, resource locations for transmitting PUCCH, PDCCH, and the like are indicated by DCI.

In addition, inter-slot scheduling is supported in a 5G system, that is, the transmission of the data channel of the (n+i)-th time slot (n and i are a positive integers) is scheduled by the DCI transmitted in the n-th time slot. However, if, in the n-th time slot, the base station has not determined the time domain resource location for transmitting the control channel or the data channel in the (n+i)-th time slot, the base station cannot implement scheduling on the data channel for the (n+i)-th time slot in advance.

Figure 2:
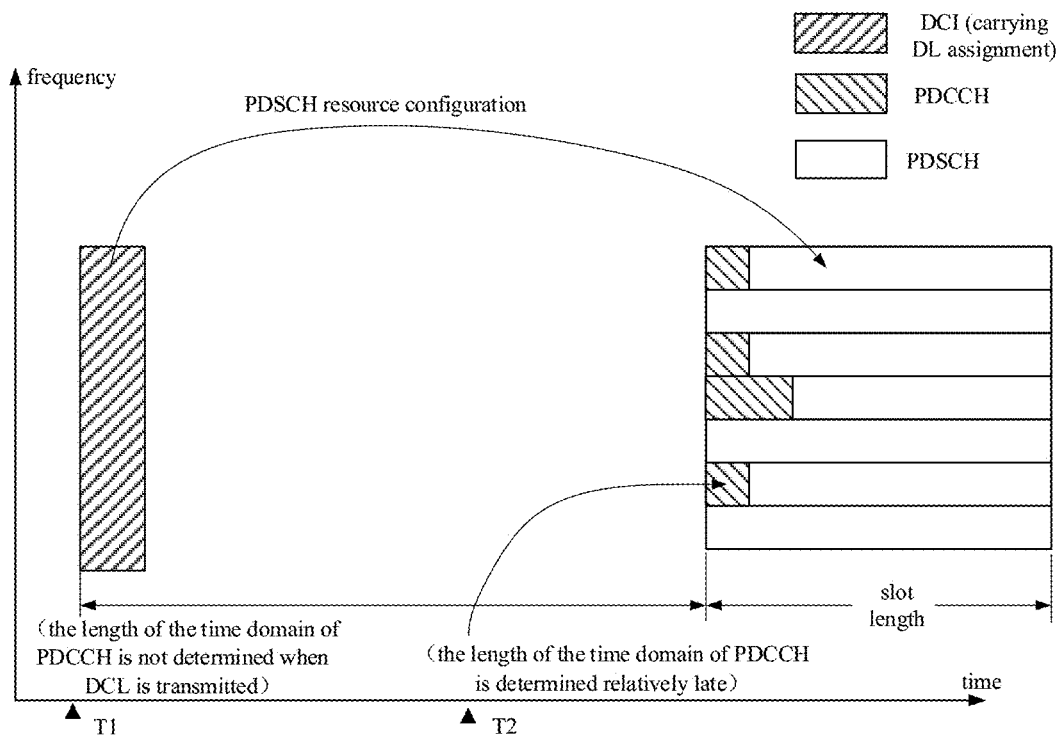
FIG. 2 is a schematic diagram of resource configuration of a PDSCH in the related art.

For example, in the resource configuration of the PDSCH shown in FIG. 2, the symbols of the start part of the (n+i)-th time slot are occupied by the downlink control channel PDCCH. If a moment T2 at which the base station determines a length of the time domain resource for transmitting the PDCCH, is later than a moment T1 at which the DCI (information carrying the downlink resource configuration (Download Assignment, briefly as "DL Assignment") of the PDSCH) is transmitted in the N-th time slot, the terminal device cannot know the location of the time domain resource for transmitting the PDCCH according to the received DL Assignment, and cannot know the accurate time domain resource location for transmitting the PDSCH in advance.

Figure 3:
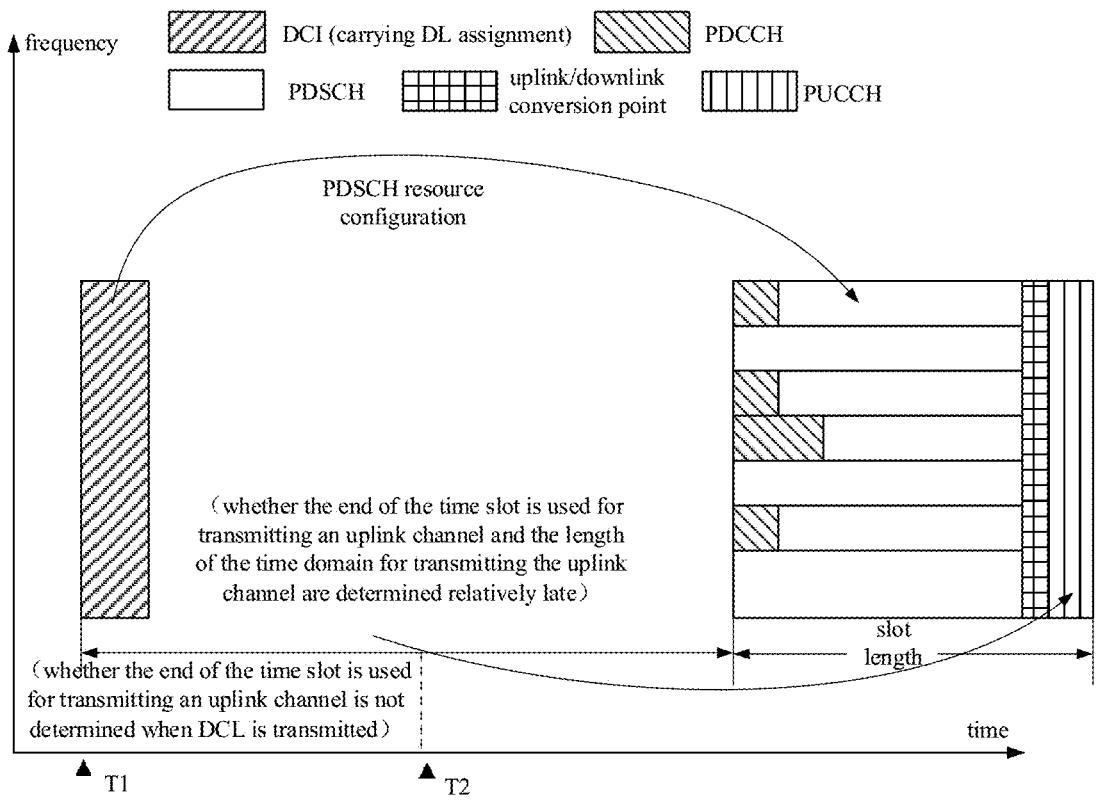
FIG. 3 is a schematic diagram of resource configuration of a PDSCH in the related art.

For another example, in the resource configuration of the PDSCH shown in FIG. 3, the symbols of the start part of the (n+i)-th time slot are occupied by the downlink control channel PDCCH, and the symbols of the end part of the (n+i)-th time slot are occupied by the uplink control channel PUCCH. If a moment T2 at which the base station determines whether to transmit PUCCH at the end of the time slot or at which the base station determines a length of the time domain resource for transmitting the PUCCH, is later than a moment T1 at which the DCI (information carrying the DL Assignment of the PDSCH) is transmitted in the n-th time slot, the terminal device cannot know whether there is an uplink channel in the time slot in advance or know the location of the time domain resource for transmitting the uplink channel according to the received DL Assignment, and cannot know the accurate time domain resource location for transmitting the PDSCH in advance.

Figure 4:
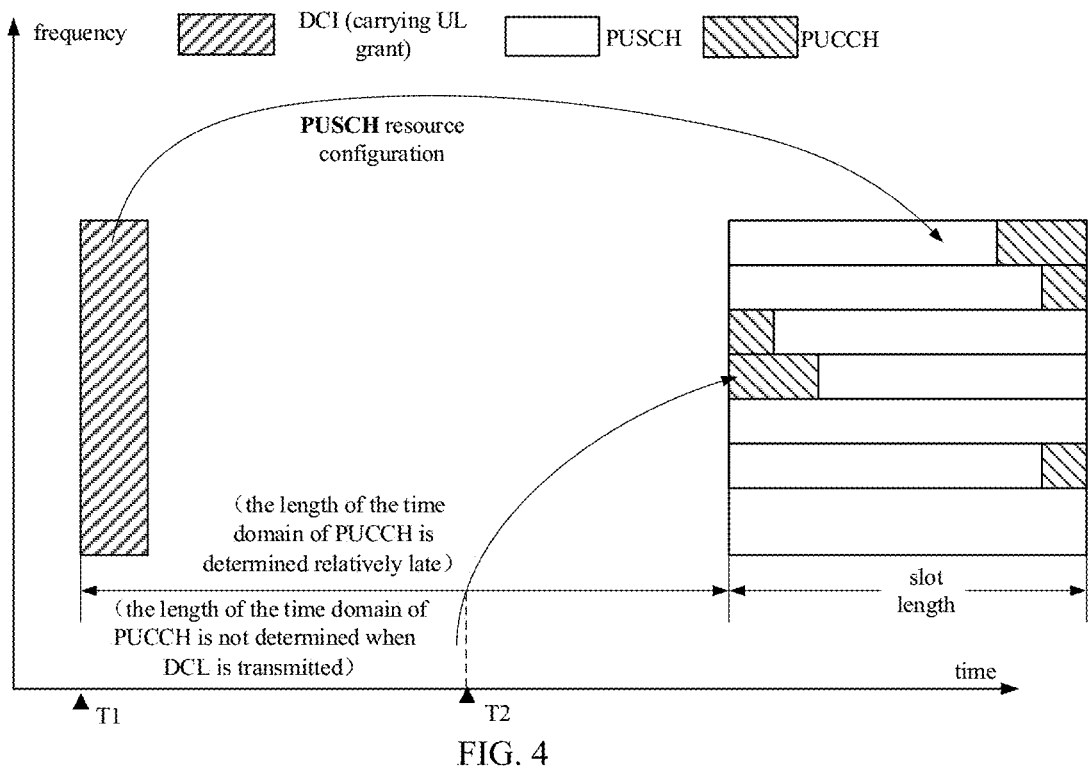
FIG. 4 is a schematic diagram of resource configuration of a PUSCH in the related art.

For still another example, in the resource configuration of the PUSCH shown in FIG. 4, part of the symbols of the (n+i)-th time slot are occupied by the uplink control channel PUCCH. If a moment T2 at which the base station determines a length of the time domain resource for transmitting the PUCCH, is later than a moment T1 at which the DCI (information carrying the uplink resource configuration (briefly as "UL Grant") of the PUSCH) is transmitted in the N-th time slot, the terminal device cannot know the location of the time domain resource for transmitting the PUCCH according to the received UL Grant, and cannot know the accurate time domain resource location for transmitting the PUSCH in advance.

For still another example, in the resource configuration of the PUSCH shown in FIG. 5, the symbols of the start part of the (n+i)-th time slot are occupied by the uplink control channel PDCCH, and part of the symbols in the time slot are occupied by the uplink channel, such as a PUCCH. If a moment T2 at which the base station determines whether to transmit the downlink channel at the beginning of the time slot or at which the base station determines a length of the time domain resource for transmitting the downlink channel, is later than a moment T1 at which the DCI (information carrying the UL Grant of the PUSCH) is transmitted in the n-th time slot, the terminal device cannot know whether there is an uplink channel in the time slot in advance or know the location of the time domain resource for transmitting the uplink channel according to the received UL Grant, and cannot know the accurate time domain resource location for transmitting the PUSCH in advance.

FIG. 6 is a schematic flowchart of a method 600 for transmitting data according to an embodiment of the present application. The method for transmitting data in FIG. 6 can be performed by a terminal device such as the terminal device 20 shown in FIG. 1. As shown in FIG. 6, the specific process of transmitting data includes the following steps.

In 610, the terminal device receives first resource indication information from the network device at a first moment.

The first moment is located in the n-th time domain resource unit, the first resource indication information indicates a frequency domain resource allocated for transmission of the target channel of the terminal device in the (n+i)-th time domain resource unit, and the target channel includes a data channel or a control channel of the terminal device, where n and i are positive integers.

Specifically, the terminal device receives the first resource indication information from the network device at the first moment in the n-th time domain resource unit (or the time domain scheduling unit), and the first resource indication information indicates a frequency domain resource allocated for transmission of a target channel of the terminal device in the (n+i)-th time domain resource unit. That is, the first resource indication information transmitted on the n-th time domain resource unit is used to schedule a frequency domain resource allocated for transmission of the target channel on the (n+i)-th time domain resource unit. This inter-slot scheduling allows the terminal device sufficient time to prepare for subsequent data transmission.

It should be understood that, in the embodiment of the present application, the n-th time domain resource unit and the (n+i)-th time domain resource unit are used to represent a time domain location relationship between two time domain resource units, and the n-th time domain resource unit can be understood as a current time domain resource unit, and a (n+i)-th time domain resource unit can be the i-th time domain resource unit after the current time domain resource unit. That is, the n-th time domain resource unit may be replaced by the first time domain resource unit, the (n+i)-th time domain resource unit may be replaced by the second time domain resource unit, and the second time domain resource unit is any time domain resource unit after the first time domain resource unit. Optionally, if the second time domain resource unit is the i-th time domain resource unit after the first time domain resource unit, the first resource indication information may further include a value of i.

Optionally, the data channel of the terminal device may include any one of an uplink data channel, a downlink data channel, and a secondary link data channel.

In 620, the terminal device receives second resource indication information from the network device at a second moment after the first moment.

The second resource indication information indicates a time domain resource for transmitting the data channel in the (n+i)-th time domain resource unit.

Optionally, the time domain resource allocated for transmission of the target channel in the (n+i)-th time domain resource unit is determined by the network device after the first moment.

Optionally, the second resource indication information is UE specific information of the terminal device.

Optionally, the n-th time domain resource unit includes any one of an n-th time slot, an n-th mini-slot, and an n-th subframe.

In a 5G system, the time domain resource unit may be a time slot, a mini-slot, or a subframe. The n-th time domain resource unit may be the n-th time slot, the n-th mini-slot, and the n-th subframe; and the (n+i)-th time domain resource unit may be the (n+i)-th time slot, the (n+i)-th mini-slot and (n+i)-th subframe.

Optionally, the physical channel used by the terminal device to receive the first resource indication information may be different from the physical channel used to receive the second resource indication information.

In the inter-slot scheduling, in the n-th time slot, the network device may not have determined the time domain resource location for transmitting the control channel or the data channel in the (n+i)-th time slot, so the network device cannot implement resource scheduling on the target channel for the (n+i)-th time slot in advance. Therefore, the network device may first indicate, with the first resource indication information, a frequency domain resource allocated for transmission of the target channel in the (n+i)-th time domain resource unit, and configure, in the second moment after the first moment, the time domain resource allocated for transmission of the target channel in the (n+i)-th time domain resource unit to the terminal device. At the second moment, the network device has determined the time domain resource allocated for transmission of the target channel in the (n+i)-th time domain resource unit.

The terminal device receives the second resource indication information from the network device to acquire the time domain resource allocated for transmission of the target channel in the (n+i)-th time domain resource unit, at the second moment after the first moment. The terminal device may determine, according to the first resource indication information and the second resource indication information, a time and frequency resource allocated for transmission of the target channel in the (n+i)-th time domain resource unit.

Optionally, the time domain resource indicated by the second resource indication information includes at least one of: a start location of symbols allocated for transmission of the target channel in the (n+i)-th time domain resource unit, the number of symbols allocated for transmission of the target channel, the mini-slots allocated for transmission of the target channel, and the number of mini-slots allocated for transmission of the target channel.

Specifically, the second resource indication information received by the terminal device may indicate a start location and/or a number of symbols occupied by the time domain resource allocated for transmission of the target channel in the (n+i)-th time domain resource unit. The second resource indication information may also indicate the start location of the mini-slot and/or the number of mini-slots occupied by the time-domain resource allocated for transmission of the target channel in the (n+i)-th time-domain resource unit. In this case, a time slot resource unit may include several mini-slots. If one time domain resource unit may include several mini-slots, and each mini-slot includes several symbols, the second resource indication information may also indicate information of a mini-slot occupied by the time domain resource allocated for transmission of the target channel in the (n+i)-th time domain resource unit, and information of symbols occupied in the mini-slot, which is not limited here.

Optionally, the second resource indication information may further include an identifier of the time domain resource, and the time domain resource indicated by the second resource indication information is a time domain resource corresponding to the identifier in a plurality of preset time domain resources.

That is to say, the time domain resource allocated for transmission of the target channel in the (n+i)-th time domain resource unit may be one of a plurality of preset time domain resource configurations, and may specifically determined by an identifier corresponding to the time domain resource. For example, the time domain resource corresponding to the identifier 1 is the 2nd-7th symbols in the time slot, and the time domain resource corresponding to the identifier 2 is the 3rd-7th symbols in the time slot, etc. If the second resource indication information carries the identifier 1, then the terminal device will transmit the target channel on the 2nd-7th symbols in this time slot.

Optionally, the first resource indication information further indicates a time domain resource allocated for transmission of the target channel in the (n+i)-th time domain resource unit.

If the first resource indication information indicates not only the frequency domain resource allocated for transmission of the target channel in the (n+i)-th time domain resource unit, but also indicates the time domain resource allocated for transmission of the target channel in the (n+i)-th time domain resource unit, the terminal device can jointly process the first resource indication information and the second resource indication information in the following two implementations.

Implementation 1

Optionally, the method further includes: determining, by the terminal device, whether the time domain resource indicated by the first resource indication information is the same as the time domain resource indicated by the second resource indication information; and if the time domain resource indicated by the first resource indication information is different from the time domain resource indicated by the second resource indication information, the terminal device determining to use the time domain resource indicated by the second resource indication information to transmit the target channel.

In this embodiment, if the time domain resource allocated for transmission of the target channel in the (n+i)-th time domain resource unit as indicated by the first resource indication information is different from, or conflicts with the time domain resource for transmitting the data in the (n+i)-th time domain resource unit as indicated by the second resource indication information, the terminal device selects the time domain resource indicated by the second resource indication information as the time domain resource allocated for transmission of the target channel in the (n+i)-th time domain resource unit.

When performing resource scheduling, the network device may first indicate to the terminal device a default time domain resource location with the first time domain resource indication, and the default time domain resource location may be, for example, the location most likely to be used by the terminal device allocated for transmission of the target channel according to statistics. If the terminal device does not receive the second resource indication information after the first time instance, the terminal device determines to transmit the target channel on the time domain resource indicated by the first resource indication information. If the network device re-determines the time domain resource allocated for transmission of the target channel in the (n+i)-th time domain resource unit after the first time instance, the terminal device receives second resource indication information from the network device at the second moment, and based on the time domain resource location indicated by the second resource indication information, the terminal device determines to transmit the target channel on the time domain resource indicated by the second resource indication information. The second resource indication information may be regarded as a supplement and a modification of the first resource indication information, and when receiving the second resource indication information, the terminal device shall use the time domain resource indicated by the second resource indication information as the time domain resource allocated for transmission of the target channel.

Implementation 2

Optionally, the method further includes: determining, by the terminal device, the time domain resource allocated for transmission of the target channel according to the second resource indication information, within a range of time domain resources indicated by the first resource indication information.

In this embodiment, the range of the time domain resource allocated for transmission of the target channel in the (n+i)-th time domain resource unit indicated by the first resource indication information is larger than that of the time domain resource for transmitting the data in the (n+i)-th time domain resource unit indicated by the second resource indication information. The network device may first indicate a rough range of the time domain resource to the terminal device with the first resource indication information, and after specifically determining the time domain resource allocated for transmission of the target channel in the (n+i)-th time domain resource unit, indicate a specific time domain resource location allocated for transmission of the target channel in the (n+i)-th time domain resource unit with the second resource indication information.

Taking the target channel as a data channel as an example, assuming that the time domain resource unit is a subframe, the time domain resource for transmitting the data channel in the (n+i)-th subframe as indicated by the first resource indication information is the first time slot in the subframe, and the time domain resource for transmitting the data channel in the (n+i)-th subframe as indicated by the second resource indication information is specifically the 2nd-7th symbols in the first time slot.

For another example, the time domain resource unit is a time slot, and the time domain resource for transmitting the data channel in the (n+i)-th time slot as indicated by the first resource indication information is the first mini-slot in the subframe, and the time domain resource for transmitting the data channel in the (n+i)-th time slot as indicated by the second resource indication information is the first symbol in the first mini-slot.

Optionally, in 620, the terminal device receiving the second resource indication information from the network device at a second moment after the first moment includes: the terminal device receiving the second resource indication information from the network device at a second moment after the first moment on a preset frequency domain resource.

That is, the time-frequency resource used by the terminal device to receive the second resource indication information is pre-agreed. For example, there may be a fixed positional relationship between the time-frequency resource location of the second resource indication information and the time-frequency resource location of the first resource indication information. After receiving the first resource indication information, the terminal device can know on which time-frequency resource to receive the second resource indication information. The time domain resource for receiving the second resource indication information is the second time instance.

Further, optionally, the first resource indication information includes the second moment and the preset frequency domain resource for receiving the second resource indication information, and before the terminal device receives the second resource indication information from the network device, the method also includes:

the terminal device determining, according to the first resource indication information, a second moment and the preset frequency domain resource for receiving the second resource indication information.

That is, the information of the time-frequency resource used by the terminal device to receive the second resource indication information is carried in the first resource indication information. After receiving the first resource indication information, the terminal device may obtain not only the frequency domain resource allocated for transmission of the target channel in the (n+i)-th time domain resource unit but also a time domain resource (that is the second time instance) and a frequency domain resource for receiving the second resource indication information from the first resource indication information, so that the terminal device further acquires the time domain resource allocated for transmission of the target channel in the (n+i)-th time domain resource unit from the second resource indication information received at the second time instance.

Optionally, after 620, the method further includes 630.

In 630, the terminal device sends the target channel to the network device or receives the target channel from the network device on the frequency domain resource in the (n+i)-th time domain resource unit and the time domain resource.

The terminal device acquires a frequency domain resource allocated for transmission of the target channel according to the first resource indication information, and acquires a time domain resource allocated for transmission of the target channel according to the second resource indication information, thereby transmitting the target channel to the network device or receiving the target channel from the network device on the frequency domain resource and the time domain resource in the (n+i)-th time domain resource unit.

The foregoing method may be applied to scenarios of uplink and downlink transmission, the target channel may be a data channel or a control channel, and the data channel may be an uplink data channel, a downlink data channel, or a sidelink data channel. In particular, for the transmission of the uplink data channel or the control channel, the terminal device acquires the DCI carrying the first resource indication information in advance, and may have sufficient time to prepare for the transmission of the uplink data channel, and by receiving the second resource indication information, knows whether the uplink data channel is occupied by the uplink and downlink control channel, and the specific time domain resource location of the uplink data channel, so that the uplink data channel transmission process is not interfered by other control channels.

In the method for transmitting data in the embodiment of the present application, after the terminal device receives the downlink control information that carries the transmission resource information, by receiving the indication information for indicating the resource for transmitting the uplink/downlink channel, which is from the network device as supplementation, the terminal device can also accurately know the resource location for transmitting the uplink/downlink channel on the basis of implementing resource scheduling in advance.

Therefore, after receiving the downlink control information carrying the transmission resource information, by receiving the indication information for indicating the resource for transmitting the uplink/downlink channel, which is sent by the network device as supplementation, the terminal device can also accurately know the resource location for transmitting the uplink/downlink channel on the basis of implementing resource scheduling in advance.

It should be understood that, in the embodiments of the present disclosure, the n-th time domain resource unit can be understood as a current time domain resource unit, and a (n+i)-th time domain resource unit can be the i-th time domain resource unit after the current time domain resource unit. That is, the n-th time domain resource unit may be replaced by the first time domain resource unit, the (n+i)-th time domain resource unit may be replaced by the second time domain resource unit, and the second time domain resource unit is any time domain resource unit after the first time domain resource unit. Optionally, if the second time domain resource unit is the i-th time domain resource unit after the first time domain resource unit, the first resource indication information may further include a value of i.

The method for transmitting data in the embodiment of the present application will be described in detail below with reference to the examples in FIGS. 7 to 10. In FIG. 7 to FIG. 10, the target channel is a data channel as an example for illustration.

Figure 7:
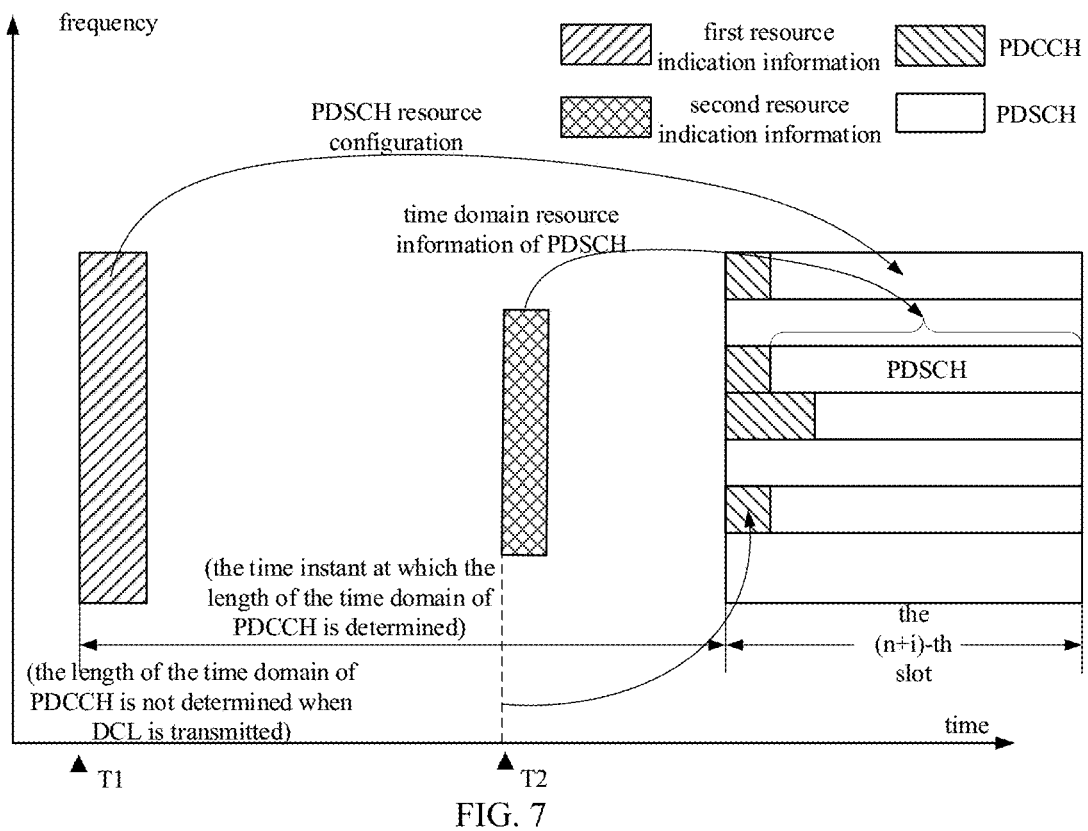
FIG. 7 is a schematic diagram of resource configuration of a PDSCH according to an embodiment of the present application.

For example, the resource configuration of the PDSCH is as shown in FIG. 7. The initial time domain resource in the (n+i)-th time slot is occupied by the downlink control channel PDCCH. The network device sends the first resource indication information to the terminal device in the n-th time slot to schedule the transmission resource of the PDSCH. However, at the moment for transmitting the first resource indication information, that is, at the moment T1, the location of the time domain resource occupied by the PDCCH in the (n+i)-th time slot is not determined. After the time domain resource occupied by the PDCCH in the time slot is determined, the network device may send the second resource indication information at moment T2 to indicate to the terminal device the time domain resource for transmitting the PDSCH. Therefore, by indicating to the terminal device as supplementation the accurate time domain resource for transmitting the PDSCH in the (n+i)-th time slot, it can avoid the situation that the terminal device receives the PDCCH as the PDSCH by mistake, thereby ensuring demodulation and decoding performance of the PDSCH.

Figure 8:
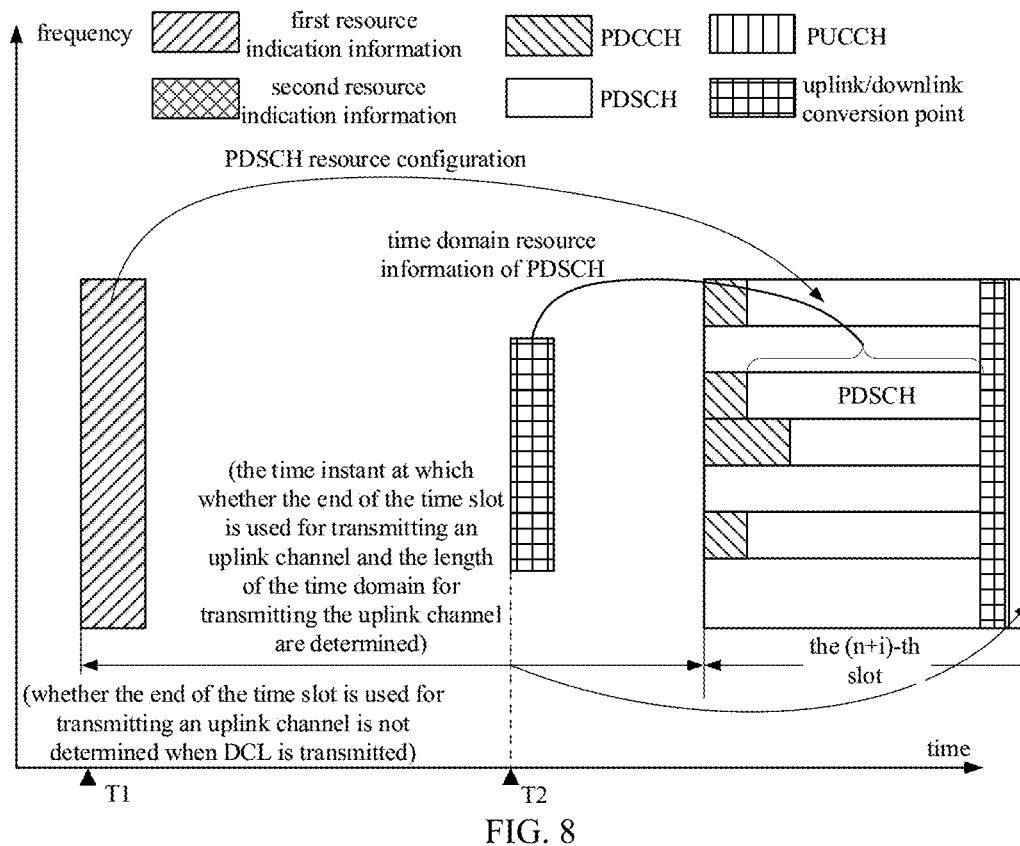
FIG. 8 is a schematic diagram of resource configuration of a PDSCH according to an embodiment of the present application.

For another example, the resource configuration of the PDSCH is as shown in FIG. 8. The initial time domain resource in the (n+i)-th time slot is occupied by the downlink control channel PDCCH, and the time domain resource at the end of the time slot is occupied by an uplink channel such as a PUCCH. The network device sends the first resource indication information to the terminal device in the n-th time slot to schedule the transmission resource of the PDSCH. However, at the moment for transmitting the first resource indication information, that is, at the moment T1, it is not determined whether there is a PDCCH and a PUCCH, and a location of a time domain resource for transmitting PDCCH and PUCCH in the slot is not determined. After determining the location of the time domain resource for transmitting the PDCCH and the PUCCH in the time slot, the network device may send the second resource indication information at moment T2 to indicate to the terminal device the time domain resource for transmitting the PDSCH. Therefore, by indicating to the terminal device as supplementation the accurate time domain resource for transmitting the PDSCH in the (n+i)-th time slot, it can avoid the situation that the terminal device erroneously receives the PDCCH and PUCCH as the PDSCH, thereby ensuring demodulation and decoding performance of the PDSCH.

Figure 9:
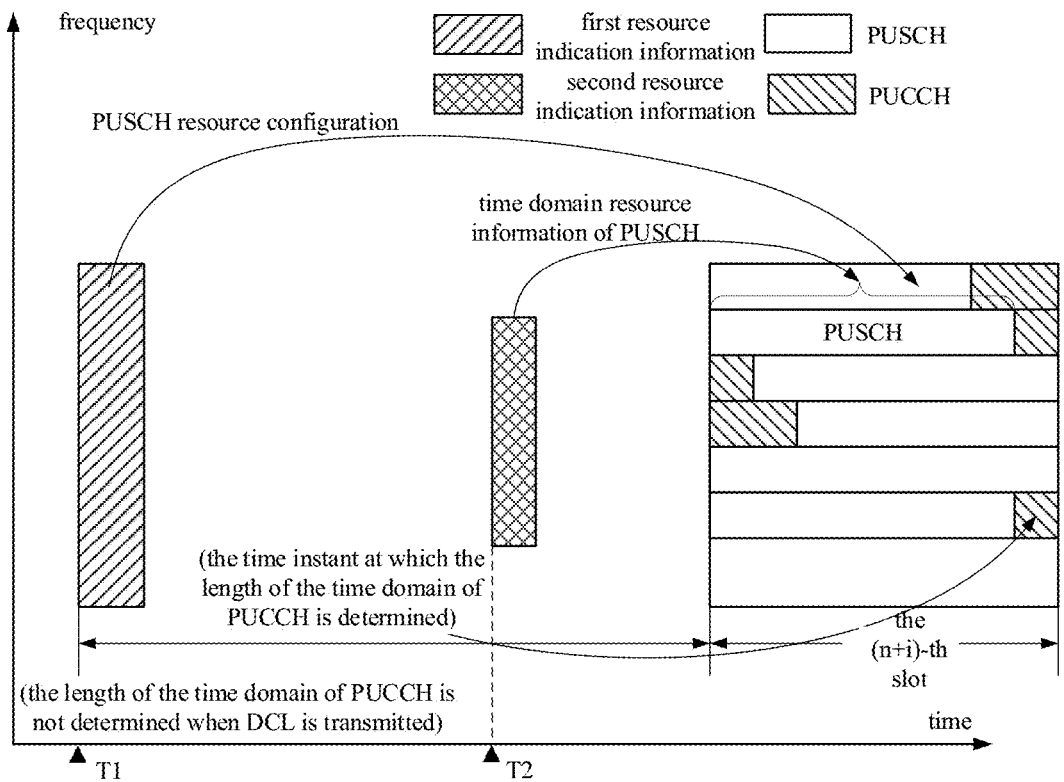
FIG. 9 is a schematic diagram of resource configuration of a PUSCH according to an embodiment of the present application.

For another example, the resource configuration of the PUSCH is as shown in FIG. 9. The initial time domain resource in the (n+i)-th time slot and the time domain resource at the end may be occupied by the uplink control channel PUCCH. The network device sends the first resource indication information to the terminal device in the n-th time slot to schedule the transmission resource of the PUSCH. However, at the moment for transmitting the first resource indication information, that is, at the moment T1, the location of the time domain resource occupied by the PUCCH in the (n+i)-th time slot is not determined. After the time domain resource occupied by the PUCCH in the time slot is determined, the network device may send the second resource indication information at moment T2 to indicate to the terminal device the time domain resource for transmitting the PUSCH. Therefore, by indicating to the terminal device as supplementation the accurate time domain resource for transmitting the PDSCH in the (n+i)-th time slot, it can avoid the situation that the PUSCH from the terminal device collides with the PUCCH from other terminal devices, and can avoid the mutual interference between the PDSCH and the PUCCH, the transmission performance of the PUSCH and the PUCCH can be improved.

Figure 10:
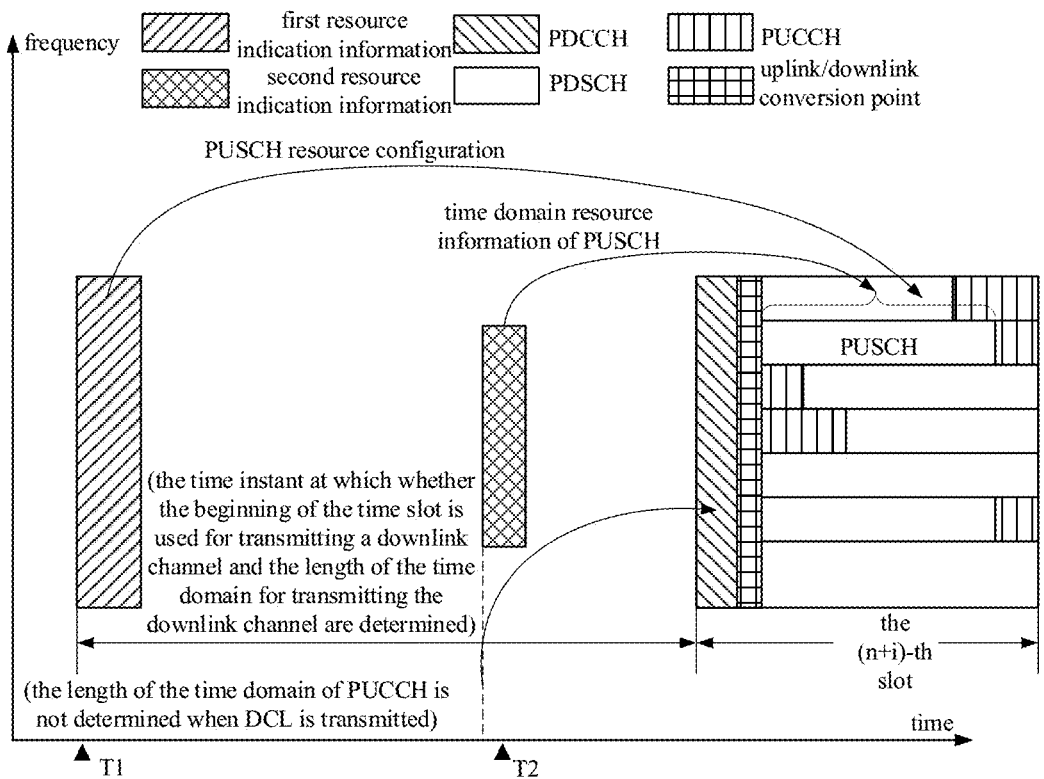
FIG. 10 is a schematic diagram of resource configuration of a PUSCH according to an embodiment of the present application.

For another example, the resource configuration of the PUSCH is as shown in FIG. 10. The initial time domain resource in the (n+i)-th time slot and the time domain resource at the end of the time slot may be occupied by an uplink channel PUCCH. The network device sends the first resource indication information to the terminal device in the n-th time slot to schedule the transmission resource of the PDSCH. However, at the moment for transmitting the first resource indication information, that is, at the moment T1, it is not determined whether there is a PDCCH and a PUCCH, and a location of a time domain resource for transmitting PDCCH and PUCCH in the slot is not determined. After determining the location of the time domain resource for transmitting the PDCCH and the PUCCH in the time slot, the network device may send the second resource indication information at moment T2 to indicate to the terminal device the time domain resource for transmitting the PUSCH. Therefore, by indicating to the terminal device as supplementation the accurate time domain resource for transmitting the PUSCH in the (n+i)-th time slot, it can avoid the mutual interference between the PUSCH and the downlink channel from the network device, and can improve the transmission performance of the PUSCH and the downlink channel.

FIG. 11 is a schematic flowchart of a method 1100 for transmitting data according to an embodiment of the present application. The method for transmitting data in FIG. 11 can be performed by a network device such as the network device 10 shown in FIG. 1. As shown in FIG. 11, the specific process of transmitting data includes the following steps.

In 1110, the network device sends first resource indication information to the network device at a first moment.

The first moment is located in the n-th time domain resource unit, the first resource indication information indicates a frequency domain resource allocated for transmission of the target channel of the terminal device in the (n+i)-th time domain resource unit, and the target channel includes a data channel or a control channel of the terminal device, where n and i are positive integers.

Specifically, the network device sends the first resource indication information to the terminal device at the first moment in the n-th time domain resource unit (or the time domain scheduling unit), and the first resource indication information indicates a frequency domain resource allocated for transmission of a target channel of the terminal device in the (n+i)-th time domain resource unit. That is, the first resource indication information transmitted on the n-th time domain resource unit is used to schedule a frequency domain resource allocated for transmission of the target channel on the (n+i)-th time domain resource unit. This inter-slot scheduling allows the terminal device sufficient time to prepare for subsequent data transmission.

It should be understood that, the n-th time domain resource unit can be understood as a current time domain resource unit, and a (n+i)-th time domain resource unit can be the i-th time domain resource unit after the current time domain resource unit. That is, the n-th time domain resource unit may be replaced by the first time domain resource unit, the (n+i)-th time domain resource unit may be replaced by the second time domain resource unit, and the second time domain resource unit is any time domain resource unit after the first time domain resource unit. Optionally, if the second time domain resource unit is the i-th time domain resource unit after the first time domain resource unit, the first resource indication information may further include a value of i.

Optionally, the data channel may include any one of an uplink data channel, a downlink data channel, and a secondary link data channel.

In 1120, the network device sends second resource indication information to the terminal device at a second moment after the first moment.

The second resource indication information indicates a time domain resource allocated for transmission of the target channel in the (n+i)-th time domain resource unit.

Optionally, the time domain resource allocated for transmission of the target channel in the (n+i)-th time domain resource unit is determined by the network device after the first moment.

Optionally, the second resource indication information is UE specific information of the terminal device.

Optionally, the n-th time domain resource unit includes any one of an n-th time slot, an n-th mini-slot, and an n-th subframe.

Optionally, the physical channel used by the terminal device to receive the first resource indication information may be different from the physical channel used to receive the second resource indication information.

In the inter-slot scheduling, in the n-th time slot, the network device may not have determined the time domain resource location for transmitting the control channel or the target channel in the (n+i)-th time slot, so the network device cannot implement resource scheduling on the target channel for the (n+i)-th time slot in advance. Therefore, the network device may first indicate, with the first resource indication information, a frequency domain resource allocated for transmission of the target channel in the (n+i)-th time domain resource unit, and configure, in the second moment after the first moment, the time domain resource allocated for transmission of the target channel in the (n+i)-th time domain resource unit to the terminal device. At the second moment, the network device has determined the time domain resource allocated for transmission of the target channel in the (n+i)-th time domain resource unit.

Optionally, the time domain resource indicated by the second resource indication information includes at least one of: a start location of symbols allocated for transmission of the target channel in the (n+i)-th time domain resource unit, the number of symbols allocated for transmission of the target channel, the mini-slots allocated for transmission of the target channel, and the number of mini-slots allocated for transmission of the target channel.

Specifically, the second resource indication information received by the terminal device may indicate a start location and/or a number of symbols occupied by the time domain resource allocated for transmission of the target channel in the (n+i)-th time domain resource unit. The second resource indication information may also indicate the start location of the mini-slot and/or the number of mini-slots occupied by the time-domain resource allocated for transmission of the target channel in the (n+i)-th time-domain resource unit. In this case, a time slot resource unit may include several mini-slots. If one time domain resource unit may include several mini-slots, and each mini-slot includes several symbols, the second resource indication information may also indicate information of a mini-slot occupied by the time domain resource allocated for transmission of the target channel in the (n+i)-th time domain resource unit, and information of symbols occupied in the mini-slot, which is not limited here.

Optionally, the second resource indication information may further include an identifier of the time domain resource, and the time domain resource indicated by the second resource indication information is a time domain resource corresponding to the identifier in a plurality of preset time domain resources.

That is to say, the time domain resource allocated for transmission of the target channel in the (n+i)-th time domain resource unit may be one of a plurality of preset time domain resource configurations, and may specifically determined by an identifier corresponding to the time domain resource.

Optionally, the first resource indication information further indicates a time domain resource allocated for transmission of the target channel in the (n+i)-th time domain resource unit.

Optionally, the method further includes: determining, by the network device, whether the time domain resource indicated by the first resource indication information is the same as the time domain resource indicated by the second resource indication information; and if the time domain resource indicated by the first resource indication information is different from the time domain resource indicated by the second resource indication information, the network device determining to use the time domain resource indicated by the second resource indication information to transmit the target channel.

In this embodiment, if the time domain resource allocated for transmission of the target channel in the (n+i)-th time domain resource unit as indicated by the first resource indication information is different from, or conflicts with the time domain resource for transmitting the data in the (n+i)-th time domain resource unit as indicated by the second resource indication information, the network device takes the time domain resource indicated by the second resource indication information as the time domain resource allocated for transmission of the target channel in the (n+i)-th time domain resource unit.

Optionally, the method further includes: determining, by the network device, the time domain resource allocated for transmission of the target channel according to the second resource indication information, within a range of time domain resources indicated by the first resource indication information.

In this embodiment, the range of the time domain resource allocated for transmission of the target channel in the (n+i)-th time domain resource unit indicated by the first resource indication information is larger than that of the time domain resource for transmitting the data in the (n+i)-th time domain resource unit indicated by the second resource indication information. The network device may first indicate a rough range of the time domain resource to the terminal device with the first resource indication information, and after specifically determining the time domain resource allocated for transmission of the target channel in the (n+i)-th time domain resource unit, indicate a specific time domain resource location allocated for transmission of the target channel in the (n+i)-th time domain resource unit with the second resource indication information.

Optionally, in 1120, the network device sending the second resource indication information to the terminal device at a second moment after the first moment includes: the network device sending the second resource indication information to the terminal device at a second moment after the first moment on a preset frequency domain resource.

That is, the time-frequency resource used by the network device to send the second resource indication information is pre-agreed. For example, there may be a fixed positional relationship between the time-frequency resource location of the second resource indication information and the time-frequency resource location for transmitting the first resource indication information. After sending the first resource indication information, the network device may send the second resource indication information on the responding time-frequency resource. The time domain resource for sending the second resource indication information is the second time instance.

Further, optionally, the first resource indication information includes the second moment and the preset frequency domain resource for receiving the second resource indication information, and before the network device sends the second resource indication information to the terminal device, the method also includes:

the network device determining a second moment and the preset frequency domain resource for receiving the second resource indication information.

That is, the information of the time-frequency resource used by the network device to send the second resource indication information is carried in the first resource indication information to be indicated to the terminal device. After receiving the first resource indication information, the terminal device may obtain not only the frequency domain resource allocated for transmission of the target channel in the (n+i)-th time domain resource unit but also a time domain resource (that is the second time instance) and a frequency domain resource for receiving the second resource indication information from the first resource indication information, so that the terminal device further acquires the time domain resource allocated for transmission of the target channel in the (n+i)-th time domain resource unit from the second resource indication information received at the second time instance.

Optionally, after 1120, the method further includes 1130.

In 1130, the network device sends the target channel to the terminal device or sends the target channel to the terminal device on the frequency domain resource in the (n+i)-th time domain resource unit and the time domain resource.

In the method for transmitting data in the embodiment of the present application, after the network device sends the downlink control information that carries the transmission resource information to the terminal device, by sending the indication information for indicating the resource for transmitting the uplink/downlink channel to the terminal device as supplementation, the terminal device can also accurately know the resource location for transmitting the uplink/downlink channel on the basis of implementing resource scheduling on the terminal device in advance.

Therefore, after the network device sends the downlink control information that carries the transmission resource information to the terminal device, by sending the indication information for indicating the resource for transmitting the uplink/downlink channel to the terminal device as supplementation, the terminal device can also accurately know the resource location for transmitting the uplink/downlink channel on the basis of implementing resource scheduling on the terminal device in advance.

It should be understood that, in the embodiments of the present disclosure, the n-th time domain resource unit can be understood as a current time domain resource unit, and a (n+i)-th time domain resource unit can be the i-th time domain resource unit after the current time domain resource unit. That is, the n-th time domain resource unit may be replaced by the first time domain resource unit, the (n+i)-th time domain resource unit may be replaced by the second time domain resource unit, and the second time domain resource unit is any time domain resource unit after the first time domain resource unit. Optionally, if the second time domain resource unit is the i-th time domain resource unit after the first time domain resource unit, the first resource indication information may further include a value of i.

For details of the network device configuring the transmission resource for the terminal device through the first resource indication information and the second resource indication information, reference may be made to the descriptions of FIG. 7 to FIG. 10, which will not be repeated for brevity.

It should be understood that, in the embodiment of the present application, the first resource indication information and the second resource indication information that are from the network device to the terminal device are all time domain resources used allocated for transmission of the target channel in the time domain resource unit. Here, the term "indication" may be a direct indication or an indirect indication. For example, the network device may directly carry the information of the time domain resource allocated for transmission of the target channel in the second resource indication information, thereby directly indicating to the terminal device the time domain resource used allocated for transmission of the target channel in the time domain resource unit; or, the network device may also carry the time domain resource occupied by the other channel in the time slot in the second resource indication information, so that the terminal device may infer that the time domain resource allocated for transmission of the target channel in the time domain resource unit. For example, the second resource indication information carries the location of the symbol for transmitting the PDCCH in the (n+i)-th time slot, and the terminal device can infer that the remaining symbol is used for transmitting the PDSCH according to the the location of the symbol for transmitting the PDCCH.

It should also be understood that, in the embodiment of the present application, the network device may also simultaneously indicate to the terminal device the time domain resources allocated for transmission of the target channels in the plurality of time domain resource units. The network device may send first resource indication information to the terminal device at the first moment, and the first resource indication information may indicate a frequency domain resource allocated for transmission of a target channel of the terminal device on each of the K (K≥1) time domain resource units located after the n-th time domain resource unit. The network device sends second resource indication information to the terminal device at a second moment after the first moment, and the second resource indication information indicates the time domain resource allocated for transmission of a target channel in the (n+i)-th time domain resource unit. The network device may further send third resource indication information to the terminal device at a third moment after the first moment, and the third resource indication information indicates a time domain resource allocated for transmission of a target channel in the (n+k)-th time domain resource unit, where k≠i.

Figure 12:
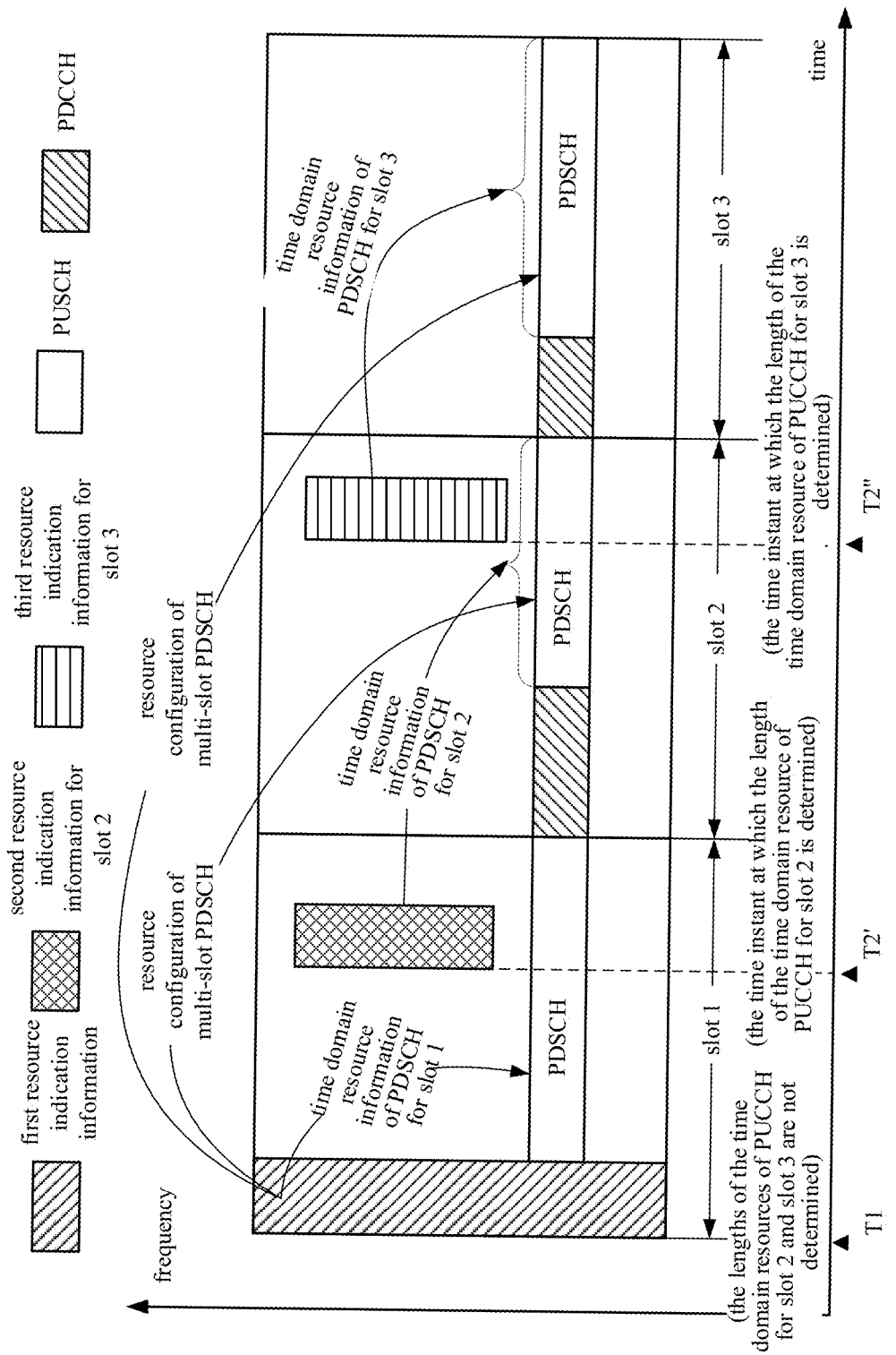
FIG. 12 is a schematic diagram of a multi-slot resource configuration of a PDSCH according to an embodiment of the present application.

For example, FIG. 12 is a schematic diagram of a multi-slot resource configuration (slot aggregation) of a PDSCH according to an embodiment of the present application. The time domain resources in slot 1 to slot 3 are all occupied by the downlink control channel PDCCH. The network device sends the first resource indication information to the terminal device in slot 1 to schedule the transmission resources of the PDSCH in slot 1 to slot 3. However, at the moment for transmitting the first resource indication information, i.e. the moment T1, the location of the time domain resource occupied by the PDCCH in slot 2 and slot 3 has not been determined yet. After the time domain resource occupied by the PDCCH in slot 2 is determined, the network device may send the second resource indication information at moment T2' to indicate to the terminal device the time domain resource for transmitting the PDSCH in the slot 2, thereby indicating to the terminal device an accurate time domain resource for transmitting the PDSCH in the slot 2 as supplementation. After the time domain resource occupied by the PDCCH in slot 3 is determined, the network device may send the third resource indication information to the terminal device at moment T2", to indicate to the terminal the time domain resource for transmitting the PDSCH in slot 3, thereby indicating to the terminal device the accurate time domain resource for transmitting the PDSCH in slot 3 as supplementation. It can avoid the situation that the terminal device receives the PDCCH as the PDSCH by mistake, thereby ensuring demodulation and decoding performance of the PDSCH.

It should be understood that, in the various embodiments of the present application, the size of the sequence numbers of the foregoing processes does not mean the order of execution sequence, and the order of execution of each process should be determined by its function and internal logic, and should not constitute any limitation on the implementation of the embodiments of the present application.

Figure 13:
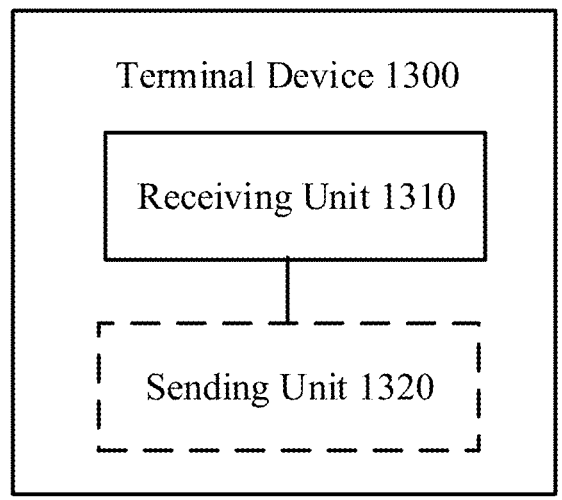
FIG. 13 is a schematic block diagram of a terminal device according to an embodiment of the present application.

FIG. 13 is a schematic block diagram of a terminal device 1300 according to an embodiment of the present application. As shown in FIG. 13, the terminal device 1300 includes a receiving unit 1310 and a sending unit 1320.

The receiving unit 1310 is configured to receive first resource indication information from the network device at a first moment, the first moment being located in the n-th time domain resource unit, the first resource indication information indicating a frequency domain resource allocated for transmission of a target channel in the (n+i)-th time domain resource unit, and the target channel including a data channel or a control channel of the terminal device, where n and i are positive integers.

The receiving unit 1310 is further configured to receive second resource indication information from the network device at a second moment after the first moment, the second resource indication information indicating a time domain resource allocated for transmission of the target channel in the (n+i)-th time domain resource unit.

Therefore, after receiving the downlink control information carrying the transmission resource information, by receiving the indication information for indicating the resource for transmitting the uplink/downlink channel, which is from the network device as supplementation, the terminal device can also accurately know the resource location for transmitting the uplink/downlink channel on the basis of implementing resource scheduling in advance.

Optionally, the time domain resource allocated for transmission of the target channel in the (n+i)-th time domain resource unit is determined by the network device after the first moment.

Optionally, the sending unit 1320 is configured to send the target channel to the network device on the frequency domain resource and the time domain resource in the (n+i)-th time domain resource unit.

The receiving unit 1310 is further configured to receive the target channel from the network device, on the frequency domain resource and the time domain resource in the (n+i)-th time domain resource unit.

Optionally, the time domain resource indicated by the second resource indication information includes at least one of: a start location of symbols allocated for transmission of the target channel in the (n+i)-th time domain resource unit, a number of symbols allocated for transmission of the target channel, a mini-slot allocated for transmission of the target channel, and a number of mini-slots allocated for transmission of the target channel.

Optionally, the second resource indication information includes an identifier of the time domain resource, and the time domain resource indicated by the second resource indication information is a time domain resource corresponding to the identifier in a plurality of preset time domain resources.

Optionally, the first resource indication information further indicates a time domain resource allocated for transmission of the target channel in the (n+i)-th time domain resource unit.

Optionally, the terminal device further includes: a determining unit configured to: determine whether the time domain resource indicated by the first resource indication information is the same as the time domain resource indicated by the second resource indication information; and if the time domain resource indicated by the first resource indication information is different from the time domain resource indicated by the second resource indication information, determine to use the time domain resource indicated by the second resource indication information to transmit the target channel.

Optionally, the terminal device further includes a determining unit configured to determine the time domain resource allocated for transmission of the target channel according to the second resource indication information, within a range of time domain resources indicated by the first resource indication information.

Optionally, the receiving unit 1310 is specifically configured to receive the second resource indication information from the network device at a second moment after the first moment on a preset frequency domain resource.

Optionally, the first resource indication information includes the second moment and the preset frequency domain resource for receiving the second resource indication information, and the determining unit is further configured to, before the receiving unit 1310 receives the second resource indication information from the network device, according to the first resource indication information, determine the second moment and the preset frequency domain resource for receiving the second resource indication information.

Optionally, the second resource indication information is UE specific information of the terminal device.

Optionally, the n-th time domain resource unit includes any one of an n-th time slot, an n-th mini-slot, and an n-th subframe.

Optionally, the physical channel used by the receiving unit 1310 to receive the first resource indication information is different from the physical channel used to receive the second resource indication information.

Optionally, the data channel includes any one of an uplink data channel, a downlink data channel, and a secondary link data channel.

Figure 14:
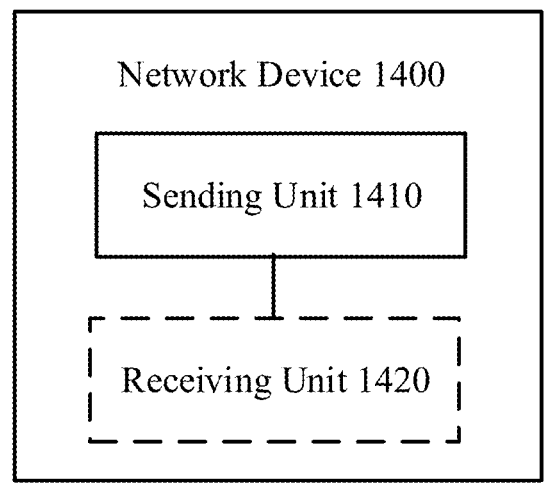
FIG. 14 is a schematic block diagram of a network device according to an embodiment of the present application.

FIG. 14 is a schematic block diagram of a network device 1400 according to an embodiment of the present application. As shown in FIG. 14, the network device 1400 includes a sending unit 1410 and a receiving unit 1420.

The sending unit 1410 is configured to send first resource indication information to the terminal device at a first moment, the first moment being located in the n-th time domain resource unit, the first resource indication information indicating a frequency domain resource allocated for transmission of a target channel in the (n+i)-th time domain resource unit, and the target channel including a data channel or a control channel of the terminal device, where n and i are positive integers.

The sending unit 1410 is further configured to send second resource indication information to the terminal device at a second moment after the first moment, the second resource indication information indicating a time domain resource allocated for transmission of the target channel in the (n+i)-th time domain resource unit.

Therefore, after the network device sends the downlink control information that carries the transmission resource information to the terminal device, by sending the indication information for indicating the resource for transmitting the uplink/downlink channel to the terminal device as supplementation, the terminal device can also accurately know the resource location for transmitting the uplink/downlink channel on the basis of implementing resource scheduling on the terminal device in advance.

Optionally, the time domain resource allocated for transmission of the target channel in the (n+i)-th time domain resource unit is determined by the network device after the first moment.

Optionally, the receiving unit 1420 is configured to receive the target channel from the terminal device on the frequency domain resource and the time domain resource in the (n+i)-th time domain resource unit.

The sending unit 1410 is further configured to send the target channel to the terminal device on the frequency domain resource and the time domain resource in the (n+i)-th time domain resource unit.

Optionally, the time domain resource indicated by the second resource indication information includes any one of: a start location of symbols allocated for transmission of the target channel in the (n+i)-th time domain resource unit, a number of symbols allocated for transmission of the target channel, a mini-slot allocated for transmission of the target channel, and a number of mini-slots allocated for transmission of the target channel.

Optionally, the second resource indication information includes an identifier of the time domain resource, and the time domain resource indicated by the second resource indication information is a time domain resource corresponding to the identifier in a plurality of preset time domain resources.

Optionally, the first resource indication information further indicates a time domain resource allocated for transmission of the target channel in the (n+i)-th time domain resource unit.

Optionally, the network device further includes: a determining unit configured to: determine whether the time domain resource indicated by the first resource indication information is the same as the time domain resource indicated by the second resource indication information; and if the time domain resource indicated by the first resource indication information is different from the time domain resource indicated by the second resource indication information, determine to use the time domain resource indicated by the second resource indication information to transmit the target channel.

Optionally, the network device further includes a determining unit configured to determine the time domain resource allocated for transmission of the target channel according to the second resource indication information, within a range of time domain resources indicated by the first resource indication information.

Optionally, the sending unit 1410 is specifically configured to send the second resource indication information to the terminal device at a second moment after the first moment on a preset frequency domain resource.

Optionally, the first resource indication information includes the second moment and the preset frequency domain resource for receiving the second resource indication information, and the determining unit is further configured to, before the sending unit 1410 sends the second resource indication information to the terminal device, determine the second moment and the preset frequency domain resource for receiving the second resource indication information.

Optionally, the second resource indication information is UE specific information of the terminal device.

Optionally, the n-th time domain resource unit includes any one of an n-th time slot, an n-th mini-slot, and an n-th subframe.

Optionally, the physical channel used by the network device to send the first resource indication information is different from the physical channel used to send the second resource indication information.

Optionally, the data channel includes any one of an uplink data channel, a downlink data channel, and a secondary link data channel.

Figure 15:
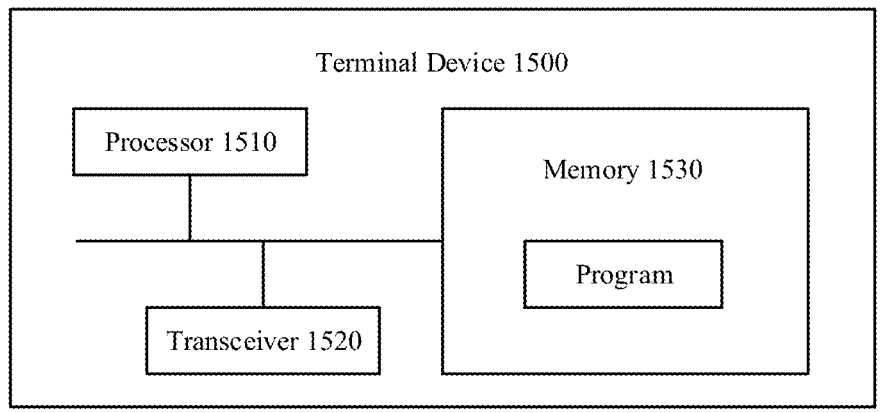
FIG. 15 is a schematic structural diagram of a terminal device according to an embodiment of the present application.

FIG. 15 is a schematic structural diagram of a terminal device 1500 according to an embodiment of the present application. As shown in FIG. 15, the terminal device includes a processor 1510, a transceiver 1520, and a memory 1530, wherein the processor 1510, the transceiver 1520, and the memory 1530 communicate with one another through an internal connection path. The memory 1530 is for storing instructions, and the processor 1510 is configured to execute the instructions stored by the memory 1530 to control the transceiver 1520 to receive signals or send signals.

Optionally, the processor 1510 can call the program codes stored in the memory 1530 to perform the corresponding operations of the terminal device in the method 600 shown in FIG. 6. For brevity, no further details are provided herein.

It should be understood that, in the embodiment of the present application, the processor 1510 may be a central processing unit (briefly as "CPU"), and the processor 1510 may also be other general-purpose processor, a digital signal processor (DSP), an application specific integrated circuit (ASIC), an off-the-shelf programmable gate array (FPGA) or other programmable logic device, a discrete gate or a transistor logic device, a discrete hardware component, and the like. The general purpose processor may be a microprocessor or the processor or any conventional processor or the like.

The memory 1530 can include a read only memory and a random access memory and provides instructions and data to the processor 1510. A portion of the memory 1530 may also include a non-volatile random access memory. For example, the memory 1530 can also store information of the device type.

In the implementation process, each step of the foregoing method may be completed by an integrated logic circuit of hardware in the processor 1510 or an instruction in a form of software. The steps of the method disclosed in the embodiment of the present application may be directly implemented by the hardware processor, or may be performed by a combination of hardware and software modules in the processor 1510. The software module can be located in a conventional storage medium such as random access memory, a flash memory, a read only memory, a programmable read only memory or an electrically erasable programmable memory, a register, and the like. The storage medium is located in the memory 1530, and the processor 1510 reads the information in the memory 1530 and performs the steps of the above method in combination with hardware. To avoid repetition, it will not be described in detail here.

The terminal device 1500 according to the embodiment of the present application may correspond to the terminal device for performing the method 600 in the foregoing method 600, and the terminal device 1300 according to the embodiment of the present application, and each unit or module in the terminal device 1500 is configured to perform operations or processes performed by the terminal device in the above method 600 Here, in order to avoid repetition, detailed description thereof will be omitted.

Figure 16:
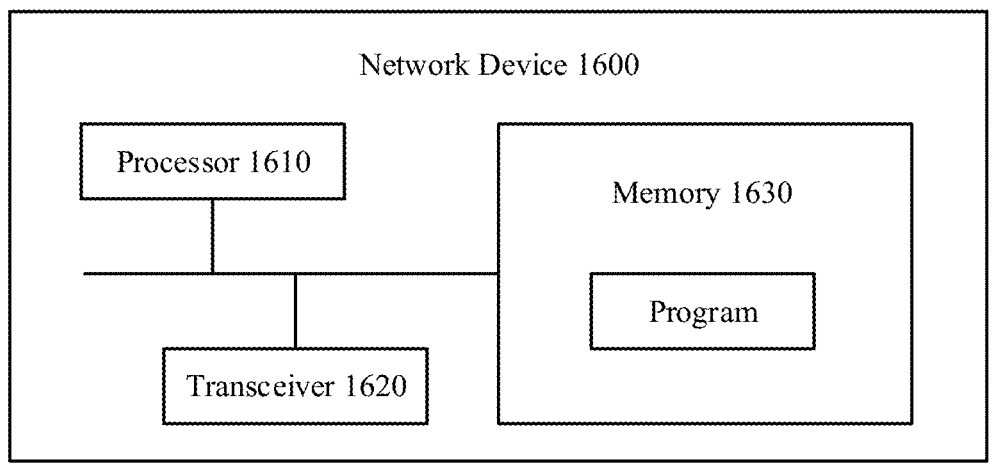
FIG. 16 is a schematic structural diagram of a network device according to an embodiment of the present application.

FIG. 16 is a schematic structural diagram of a network device 1600 according to an embodiment of the present application. As shown in FIG. 16, the network device includes a processor 1610, a transceiver 1620, and a memory 1630, wherein the processor 1610, the transceiver 1620, and the memory 1630 communicate with one another through an internal connection path. The memory 1630 is for storing instructions, and the processor 1610 is configured to execute the instructions stored by the memory 1630 to control the transceiver 1620 to receive signals or send signals.

Optionally, the processor 1610 can call the program codes stored in the memory 1630 to perform the corresponding operations of the network device in the method 1100 shown in FIG. 11. For brevity, no further details are provided herein.

It should be understood that, in the embodiment of the present application, the processor 1610 may be a central processing unit (briefly as "CPU"), and the processor 1610 may also be other general-purpose processor, a digital signal processor (DSP), an application specific integrated circuit (ASIC), an off-the-shelf programmable gate array (FPGA) or other programmable logic device, a discrete gate or a transistor logic device, a discrete hardware component, and the like. The general purpose processor may be a microprocessor or the processor or any conventional processor or the like.

The memory 1630 can include a read only memory and a random access memory and provides instructions and data to the processor 1610. A portion of the memory 1630 may also include a non-volatile random access memory. For example, the memory 1630 can also store information of the device type.

In the implementation process, each step of the foregoing method may be completed by an integrated logic circuit of hardware in the processor 1610 or an instruction in a form of software. The steps of the method disclosed in the embodiment of the present application may be directly implemented by the hardware processor, or may be performed by a combination of hardware and software modules in the processor 1610. The software module can be located in a conventional storage medium such as random access memory, a flash memory, a read only memory, a programmable read only memory or an electrically erasable programmable memory, a register, and the like. The storage medium is located in the memory 1630, and the processor 1610 reads the information in the memory 1630 and performs the steps of the above method in combination with hardware. To avoid repetition, it will not be described in detail here.

The network device 1600 according to the embodiment of the present application may correspond to the network device for performing the method 1100 in the foregoing method 1100, and the network device 1400 according to the embodiment of the present application, and each unit or module in the network device 1600 is configured to perform operations or processes performed by the network device in the above method 600 Here, in order to avoid repetition, detailed description thereof will be omitted.

Figure 17:
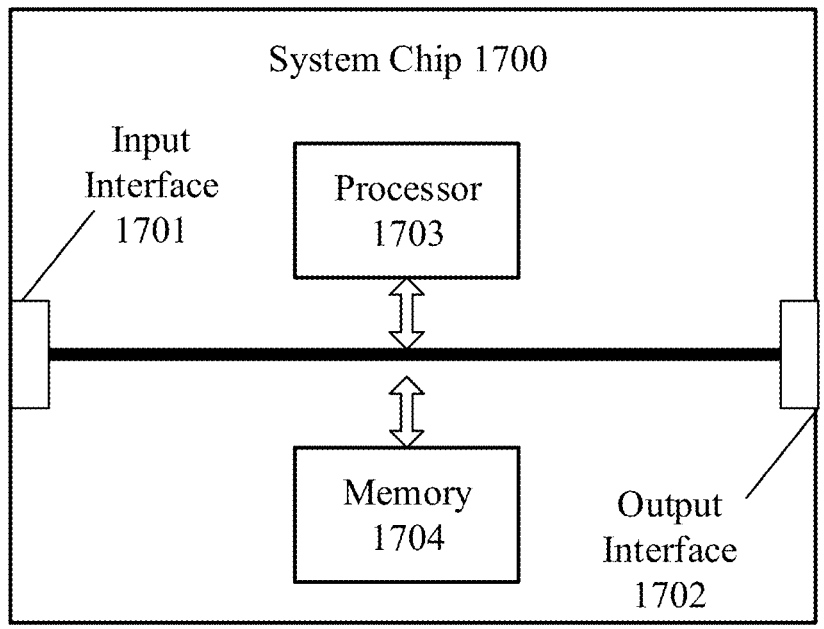
FIG. 17 is a schematic structural diagram of a system chip according to an embodiment of the present application.

FIG. 17 is a schematic structural diagram of a system chip according to an embodiment of the present application. The system chip 1700 of FIG. 17 includes an input interface 1701, an output interface 1702, at least one processor 1703, and a memory 1704. The input interface 1701, the output interface 1702, the processor 1703, and the memory 1704 are interconnected by an internal connection path. The processor 1703 is configured to execute codes in the memory 1704.

Alternatively, when the code is executed, the processor 1703 can implement the method 600 performed by the terminal device in the method embodiment. For the sake of brevity, it will not be repeated here.

Alternatively, when the code is executed, the processor 1703 can implement the method 1100 performed by the network device in the method embodiment. For the sake of brevity, it will not be repeated here.

Those of ordinary skill in the art will appreciate that the units and algorithm steps of the various examples described in connection with the embodiments disclosed herein can be implemented in electronic hardware or a combination of computer software and electronic hardware. Whether these functions are implemented in hardware or software depends on the specific application and design of the technical solution. A skilled person can use different methods to implement the described functionality for each particular application, but such implementation should not be considered beyond the scope of this application.

A person skilled in the art can clearly understand that for the convenience and brevity of the description, the specific working process of the system, the device and the unit described above can refer to the corresponding process in the foregoing method embodiment, and details are not described herein again.

In the several embodiments provided by the present application, it should be understood that the disclosed systems, devices, and methods may be implemented in other manners. For example, the device embodiments described above are merely illustrative. For example, the division of the units is only a logical function division. In actual implementation, there may be another division manner, for example, multiple units or components may be combined or may be integrated into another system, or some features can be omitted or skipped. In addition, the mutual coupling or direct coupling or communication connection shown or discussed may be an indirect coupling or communication connection through some interfaces, devices or units, and may be in an electrical, mechanical or other form.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment.

In addition, each functional unit in each embodiment of the present application may be integrated into one processing unit, or each unit may exist physically separately, or two or more units may be integrated into one unit.

This functionality, if implemented as a software functional unit and sold or used as a standalone product, can be stored on a computer readable storage medium. Based on such understanding, the technical solution of the present application, in essence or with the part contributing to the related art, or a part of the technical solution, may be embodied in the form of a software product, which is stored in a storage medium, including instructions configured to cause a computer device (which may be a personal computer, a server, or a network device, etc.) to perform all or part of the steps of the method of various embodiments of the present application. The foregoing storage medium includes: a U disk, a mobile hard disk, a Read-Only Memory (briefly as "ROM"), a Random Access Memory (briefly as "RAM"), a disk, or an optical disk, or a medium that can store program codes.

The above is only a specific embodiment of the present application, but the scope of protection of the embodiments of the present application is not limited thereto. Variations or replacements easily contemplated by any person skilled in the art within the technical scope disclosed in the embodiments of the present application, should be covered in the scope of protection of this application as appropriate for a private right. Therefore, the scope of protection of the embodiments of the present application should be determined by the scope of protection of the claims.

What is claimed is:

1. A method of transmitting data, comprising:
receiving, by a terminal device, first resource indication information from a network device at a first moment, the first moment being located in the n-th time domain resource unit, the first resource indication information indicating a frequency domain resource allocated for transmission of a target channel in the (n+i)-th time domain resource unit, and the target channel comprising a data channel or a control channel of the terminal device, where n and i are positive integers; and
receiving, by the terminal device, second resource indication information from the network device at a second moment after the first moment, the second resource indication information indicating a time domain resource allocated for transmission of the target channel in the (n+i)-th time domain resource unit,
wherein the time domain resource allocated for transmission of the target channel in the (n+i)-th time domain resource unit is determined by the network device after the first moment, and wherein the frequency domain resource allocated for transmission of the target channel in the (n+i)-th time domain resource unit is determined by the network device before the second moment.

2. The method according to claim 1, further comprising:
sending, by the terminal device, the target channel to the network device, or receiving, by the terminal device, the target channel from the network device, on the frequency domain resource and the time domain resource in the (n+i)-th time domain resource unit.

3. The method according to claim 1, wherein the time domain resource indicated by the second resource indication information comprises at least one of:
a start location of symbols allocated for transmission of the target channel in the (n+i)-th time domain resource unit, a number of symbols allocated for transmission of the target channel, a mini-slot allocated for transmission of the target channel, and a number of mini-slots allocated for transmission of the target channel.

4. The method according to claim 1, wherein the second resource indication information comprises an identifier of the time domain resource, and the time domain resource indicated by the second resource indication information is a time domain resource corresponding to the identifier in a plurality of preset time domain resources.

5. The method according to claim 1, wherein the first resource indication information further indicates a time domain resource allocated for transmission of the target channel in the (n+i)-th time domain resource unit.

6. The method according to claim 5, further comprising:
determining, by the terminal device, whether the time domain resource indicated by the first resource indication information is the same as the time domain resource indicated by the second resource indication information; and
when the time domain resource indicated by the first resource indication information is different from the time domain resource indicated by the second resource indication information, determining, by the terminal device, to use the time domain resource indicated by the second resource indication information to transmit the target channel.

7. The method according to claim 5, further comprising:
determining, by the terminal device, the time domain resource allocated for transmission of the target channel according to the second resource indication information, within a range of time domain resources indicated by the first resource indication information.

8. The method according to claim 1, wherein receiving, by the terminal device, second resource indication information from the network device at a second moment after the first moment comprises:
receiving, by the terminal device, second resource indication information from the network device at a second moment after the first moment on a preset frequency domain resource.

9. The method according to claim 8, wherein the first resource indication information comprises the second moment and the preset frequency domain resource for receiving the second resource indication information, and before the terminal device receives the second resource indication information from the network device, the method further comprises:
determining, by the terminal device, the second moment and the preset frequency domain resource for receiving the second resource indication information according to the first resource indication information.

10. The method according to claim 1, wherein the second resource indication information is UE specific information of the terminal device.

11. The method according to claim 1, wherein the n-th time domain resource unit comprises any one of:
an n-th time slot, an n-th mini-slot, and an n-th subframe.

12. The method according to claim 1, wherein the physical channel used by the terminal device to receive the first resource indication information is different from the physical channel used to receive the second resource indication information.

13. The method according to claim 1, wherein the data channel comprises any one of:
an uplink data channel, a downlink data channel, and a secondary link data channel.

14. A terminal device, comprising a processor, a transceiver, and a memory, the processor, the transceiver, and the memory communicate with each other through an internal connection path, when the processor executes instructions stored by the memory, the terminal device is caused to:
receive first resource indication information from a network device at a first moment, the first moment being located in the n-th time domain resource unit, the first resource indication information indicating a frequency domain resource allocated for transmission of a target channel in the (n+i)-th time domain resource unit, and the target channel comprising a data channel or a control channel of the terminal device, where n and i are positive integers;
wherein terminal device is further caused to receive second resource indication information from the network device at a second moment after the first moment, the second resource indication information indicating a time domain resource allocated for transmission of the target channel in the (n+i)-th time domain resource unit,
wherein the time domain resource allocated for transmission of the target channel in the (n+i)-th time domain resource unit is determined by the network device after the first moment, and wherein the frequency domain resource allocated for transmission of the target channel in the (n+i)-th time domain resource unit is determined by the network device before the second moment.

15. The terminal device according to claim 14, wherein the terminal device is further caused to:
send the target channel to the network device on the frequency domain resource and the time domain resource in the (n+i)-th time domain resource unit, and
receive the target channel from the network device, on the frequency domain resource and the time domain resource in the (n+i)-th time domain resource unit.

16. The terminal device according to claim 14, wherein the time domain resource indicated by the second resource indication information comprises at least one of:
a start location of symbols allocated for transmission of the target channel in the (n+i)-th time domain resource unit, a number of symbols allocated for transmission of the target channel, a mini-slot allocated for transmission of the target channel, and a number of mini-slots allocated for transmission of the target channel.

17. The terminal device according to claim 14, wherein the second resource indication information comprises an identifier of the time domain resource, and the time domain resource indicated by the second resource indication information is a time domain resource corresponding to the identifier in a plurality of preset time domain resources.

18. The terminal device according to claim 14, wherein the first resource indication information further indicates a time domain resource allocated for transmission of the target channel in the (n+i)-th time domain resource unit.

19. The terminal device according to claim 18, wherein the terminal device is further caused to determine whether the time domain resource indicated by the first resource indication information is the same as the time domain resource indicated by the second resource indication information; and
  when the time domain resource indicated by the first resource indication information is different from the time domain resource indicated by the second resource indication information, determine to use the time domain resource indicated by the second resource indication information to transmit the target channel.

20. The terminal device according to claim 18, wherein the terminal device is further caused to:
  determine the time domain resource allocated for transmission of the target channel according to the second resource indication information, within a range of time domain resources indicated by the first resource indication information.

21. The terminal device according to claim 14, wherein the terminal device is further caused to:
  receive the second resource indication information from the network device at a second moment after the first moment on a preset frequency domain resource.

22. The terminal device according to claim 21, wherein the first resource indication information comprises the second moment and the preset frequency domain resource for receiving the second resource indication information, and the terminal device is further caused to,
  before receiving the second resource indication information from the network device, determine the second moment and the preset frequency domain resource for receiving the second resource indication information according to the first resource indication information.

23. The terminal device according to claim 14, wherein the second resource indication information is UE specific information of the terminal device.

24. The terminal device according to claim 14, wherein the n-th time domain resource unit comprises any one of:
  an n-th time slot, an n-th mini-slot, and an n-th subframe.

25. The terminal device according to claim 14, wherein the physical channel used by the terminal device to receive the first resource indication information is different from the physical channel used to receive the second resource indication information.

26. The terminal device according to claim 14, wherein the data channel comprises any one of:
  an uplink data channel, a downlink data channel, and a secondary link data channel.

* * * * *